(12) United States Patent
Okada et al.

(10) Patent No.: US 10,446,847 B2
(45) Date of Patent: Oct. 15, 2019

(54) NONAQUEOUS LITHIUM-TYPE POWER STORAGE ELEMENT

(71) Applicant: Asahi Kasei Kabushiki Kaisha, Tokyo (JP)

(72) Inventors: Nobuhiro Okada, Tokyo (JP); Yuima Kimura, Tokyo (JP); Yusuke Yamahata, Tokyo (JP); Osamu Saito, Tokyo (JP); Kensuke Niimura, Tokyo (JP); Hidefumi Takami, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 255 days.

(21) Appl. No.: 15/324,419

(22) PCT Filed: Jul. 8, 2015

(86) PCT No.: PCT/JP2015/069665
§ 371 (c)(1),
(2) Date: Jan. 6, 2017

(87) PCT Pub. No.: WO2016/006632
PCT Pub. Date: Jan. 14, 2016

(65) Prior Publication Data
US 2017/0207459 A1   Jul. 20, 2017

(30) Foreign Application Priority Data

| Jul. 9, 2014 | (JP) | 2014-141476 |
| Jul. 18, 2014 | (JP) | 2014-147906 |
| Jul. 18, 2014 | (JP) | 2014-147963 |
| Feb. 23, 2015 | (JP) | 2015-033317 |

(51) Int. Cl.
| *H01M 4/587* | (2010.01) |
| *H01G 11/24* | (2013.01) |
| *H01G 11/32* | (2013.01) |
| *H01G 11/50* | (2013.01) |
| *H01M 10/0568* | (2010.01) |
| *H01G 11/62* | (2013.01) |
| *H01G 11/52* | (2013.01) |
| *H01M 10/0525* | (2010.01) |
| *H01M 10/0569* | (2010.01) |
| *H01G 11/06* | (2013.01) |
| *H01G 11/60* | (2013.01) |
| *H01M 4/133* | (2010.01) |
| *H01M 4/36* | (2006.01) |
| *H01M 10/0567* | (2010.01) |
| *H01M 10/056* | (2010.01) |
| *H01M 4/02* | (2006.01) |

(52) U.S. Cl.
CPC ............ *H01M 4/587* (2013.01); *H01G 11/06* (2013.01); *H01G 11/24* (2013.01); *H01G 11/32* (2013.01); *H01G 11/50* (2013.01); *H01G 11/52* (2013.01); *H01G 11/60* (2013.01); *H01G 11/62* (2013.01); *H01M 4/133* (2013.01); *H01M 4/366* (2013.01); *H01M 10/0525* (2013.01); *H01M 10/0567* (2013.01); *H01M 10/0568* (2013.01); *H01M 10/0569* (2013.01); *H01M 10/056* (2013.01); *H01M 2004/021* (2013.01); *H01M 2004/027* (2013.01); *H01M 2300/0025* (2013.01); *H01M 2300/0037* (2013.01); *Y02E 60/13* (2013.01); *Y02T 10/7011* (2013.01); *Y02T 10/7022* (2013.01)

(58) Field of Classification Search
CPC ........ H01G 11/06; H01G 11/24; H01G 11/32; H01G 11/50; H01G 11/52; H01G 11/60; H01G 11/62; H01M 10/0525; H01M 10/056; H01M 10/0567; H01M 10/0568; H01M 10/0569; H01M 2004/021; H01M 2004/027; H01M 2300/0025; H01M 2300/0037; H01M 4/133; H01M 4/366; H01M 4/587; Y02E 60/13; Y02T 10/7011; Y02T 10/7022
See application file for complete search history.

(56) References Cited

U.S. PATENT DOCUMENTS

| 2009/0174986 A1 | 7/2009 | Matsui et al. |
| 2015/0188139 A1 | 7/2015 | Kitagawa et al. |
| 2015/0255781 A1 | 9/2015 | Hashimoto |
| 2015/0270522 A1 | 9/2015 | Yamada et al. |

(Continued)

FOREIGN PATENT DOCUMENTS

| EP | 2270917 A1 | 1/2011 |
| EP | 2479832 A1 | 7/2012 |
| JP | 2006-286924 A | 10/2006 |

(Continued)

OTHER PUBLICATIONS

Supplemental European Search Report issued in corresponding European Patent Application No. 15818609.8 dated Jun. 22, 2017.

(Continued)

*Primary Examiner* — Lingwen R Zeng
(74) *Attorney, Agent, or Firm* — Morgan, Lewis & Bockius LLP

(57) ABSTRACT

A non-aqueous lithium-type power storage element obtained by a non-aqueous liquid electrolyte and an electrode laminate having a negative electrode body, a positive electrode body, and a separator being accommodated in an exterior body, wherein: the negative electrode body includes a negative electrode current collector and a negative electrode active material including a carbon material capable of occluding and releasing lithium ions.

22 Claims, No Drawings

(56) References Cited

U.S. PATENT DOCUMENTS

| | | | |
|---|---|---|---|
| 2015/0311002 A1 | 10/2015 | Okada et al. | |
| 2015/0311003 A1* | 10/2015 | Fitzgerald | H01H 1/0036 200/181 |

FOREIGN PATENT DOCUMENTS

| | | |
|---|---|---|
| JP | 2006-286926 A | 10/2006 |
| JP | 2008-524824 A | 7/2008 |
| JP | 2010-118216 A | 5/2010 |
| JP | 2010-135361 A | 6/2010 |
| JP | 2011-110371 A | 6/2011 |
| JP | 2012-038900 A | 2/2012 |
| JP | 2013-026505 A | 2/2013 |
| JP | 2013-055285 A | 3/2013 |
| JP | 2013-065765 A | 4/2013 |
| JP | 2013-149461 A | 8/2013 |
| JP | 2014-027196 A | 2/2014 |
| TW | 201419631 A | 5/2014 |
| TW | 201424102 A | 6/2014 |
| WO | 2006/068428 A1 | 6/2006 |
| WO | 2014/017617 A1 | 1/2014 |
| WO | 2014/088074 A1 | 6/2014 |

OTHER PUBLICATIONS

Lippens et al., "Studies on Pore Systems in Catalysts. V. The t Method," Journal of Catalysis, 4: 319-323 (1965).

Mikhail et al., "Investigations of a Complete Pore Structure Analysis. I. Analysis of Micropores," Journal of Colloid and Interface Science, 26: 45-53 (1968).

Barrett et al., "The Determination of Pore Volume and Area Distributions in Porous Substances. I. Computations from Nitrogen Isotherms," Journal of the American Chemical Society, 73: 373-380 (1951).

International Search Report issued in corresponding International Patent Application No. PCT/JP2015/069665 dated Sep. 29, 2015.

Written Opinion issued in corresponding International Patent Application No. PCT/JP2015/069665 dated Sep. 29, 2015.

International Preliminary Report on Patentability issued in corresponding International Patent Application No. PCT/JP2015/069665 dated Jan. 19, 2017.

* cited by examiner

NONAQUEOUS LITHIUM-TYPE POWER STORAGE ELEMENT

BACKGROUND OF THE INVENTION

Field of the Invention

The present invention relates to a nonaqueous lithium-type power storage element.

Related Background Art

In recent years, with an aim toward effective utilization of energy for greater environmental conservation and reduced usage of resources, a great deal of attention is being directed to overnight charging electric power storage systems, household dispersed power storage systems based on photovoltaic power generation technology, and power storage systems for electric vehicles.

The first requirement for such power storage systems is high energy density of the power storage elements used in them, and the development of lithium ion batteries is advancing at a rapid pace as an effective strategy for power storage elements with high energy density that can meet this requirement.

The second requirement is a high output characteristic. For example, in a combination of a high efficiency engine and a power storage system (such as in a hybrid electric vehicle), or a combination of a fuel cell and a power storage system (such as in a fuel cell electric vehicle), a high output discharge characteristic is required for the power storage system during acceleration.

Electrical double layer capacitors and nickel hydrogen cells are currently under development as high output power storage elements.

Electrical double layer capacitors that employ activated carbon in the electrodes have output characteristics of about 0.5 to 1 kW/L. Such electrical double layer capacitors have high durability (especially cycle characteristics and high-temperature storage characteristics), and have been considered optimal power storage elements in fields requiring the high output mentioned above. However, their low energy density of about 1 to 5 Wh/L and short output duration have been obstacles to their practical use.

On the other hand, nickel hydrogen cells employed in current hybrid electric vehicles exhibit high output equivalent to electrical double layer capacitors, and have energy density of about 160 Wh/L. Still, research is being actively pursued toward further increasing their energy density and output, further improving their stability at high temperatures, and increasing their durability.

Research is also advancing toward increased outputs for lithium ion batteries. For example, lithium ion batteries are being developed that yield high output exceeding 3 kW/L at 50% depth of discharge (a value representing how deeply element is discharged). However, the energy density is 100 Wh/L or less, and due to the design, the high energy density as the major feature of a lithium ion battery is reduced. The durability (especially cycle characteristics and high-temperature storage characteristics) of a lithium ion battery is inferior to that of an electrical double layer capacitor. In order to provide practical durability for a lithium ion battery, therefore, it can only be used with a depth of discharge in a narrower range than 0 to 100%. Because the usable capacity is even lower, research is actively being pursued toward further increasing durability.

There is strong demand for implementation of power storage elements exhibiting high power density, high energy density and durability, as mentioned above, but the aforementioned existing power storage elements have their advantages and disadvantages. New power storage elements that satisfy these technical requirements are therefore desired, and power storage elements known as lithium ion capacitors are under development in recent years as promising candidates.

Lithium ion capacitors are a type of power storage element using a nonaqueous electrolyte comprising a lithium ion-containing electrolyte (or, "nonaqueous lithium-type power storage element"), wherein charge-discharge is accomplished by:

non-Faraday reaction by adsorption/desorption of anions similar to an electrical double layer capacitor, at the positive electrode, and Faraday reaction by occlusion/release of lithium ions similar to a lithium ion battery, at the negative electrode.

An electrical double layer capacitor in which charge-discharge is accomplished by non-Faraday reaction at both the positive electrode and negative electrode has excellent output characteristics, but low energy density. On the other hand, a lithium ion battery, which is a secondary battery in which charge-discharge is accomplished by Faraday reaction at both the positive electrode and negative electrode, has excellent energy density but poor output characteristics. A lithium ion capacitor is a new power storage element that aims to achieve both excellent output characteristics and high energy density by accomplishing charge-discharge by non-Faraday reaction at the positive electrode and Faraday reaction at the negative electrode.

The purposes for which lithium ion capacitors are used may be electricity storage for, for example, railways, construction machines and automobiles. Because of the harsh operating environment, the capacitors used must not undergo degradation of their electrochemical properties even when used in a wide temperature range from high temperatures to low temperatures in these application. Particular problems include reduced performance caused by generation of gas by decomposition of the electrolytes, at high temperatures, and reduced performance caused by lower electric conductivity of the electrolytes, at low temperatures. As countermeasures against these problems, there have been proposed lithium ion capacitors containing fluorinated cyclic carbonates in the electrolytes (PTLs 1 and 2), lithium ion capacitors containing vinylene carbonate or its derivatives in the electrolytes (PTL 3) and other lithium ion capacitors (PTLs 4 to 7).

CITATION LIST

Patent Literature

[PTL 1] Japanese Unexamined Patent Publication No. 2006-286926

[PTL 2] Japanese Unexamined Patent Publication No. 2013-55285

[PTL 3] Japanese Unexamined Patent Publication No. 2006-286924

[PTL 4] Japanese Unexamined Patent Publication No. 2012-38900

[PTL 5] International Patent Publication No. WO2014/88074

[PTL 6] Japanese Unexamined Patent Publication No. 2014-27196

[PTL 7] Japanese Unexamined Patent Publication No. 2011-110371

SUMMARY OF THE INVENTION

The technology of PTL 1 can provide superior characteristics at low temperature, but no effect of improved durability at high temperature has been confirmed. In PTL 2, the technology reduces gas generated during the process of fabricating the capacitor, thereby improving the initial properties, but an effect of improved durability at high temperature in the completed capacitors has not been confirmed. With PTL 3 there is provided a capacitor with high capacity retention during continuous charge of the power storage element at high temperature. However, this patent document does not indicate the results for changes in characteristics after high temperature testing.

PTL 5 and PTL 6 mention initial high input/output characteristics and improved high-temperature durability, but the effect is not adequate. Moreover, the effect of improved properties has not been confirmed at low temperature.

PTL 7 discloses a lithium ion capacitor using an electrolyte containing a flame retardant additive, it being explained that the initial properties and cycle characteristics are satisfactorily maintained by the capacitor. However, the improving effect on flame retardance by the technology of PTL 7 is unclear and the safety is not confirmed, while improvement in the durability at high temperature has also not been verified.

For a conventional lithium ion capacitor, evaluation of the condition is based merely on the initial properties, and is not made based on safety considerations, or the durability in a wide temperature range from high temperatures to low temperatures, which are important for practical use.

It is therefore an object of the invention to provide a nonaqueous lithium-type power storage element that exhibits excellent properties for practical use that take into consideration the initial high input/output characteristic, high durability when exposed to high temperatures (for example, 40 to 90° C.) for prolonged periods, excellent electrochemical properties in low temperature environments, and safety.

The present inventors have conducted much diligent experimentation with the aim of solving the problems described above. As a result, it has been found that for a lithium ion capacitor, by employing a specific carbon material as the negative electrode active material, doping the negative electrode active material with a specified amount of lithium ion, and adding a specified amount of sulfite ion or sulfate ion to the negative electrode active material layer, it is possible to achieve both a high input/output characteristic in a wide temperature range, and reduced gas generation by decomposition of the electrolytes at high temperature, and minimal reduction in performance as a result, and that by using a specific electrolyte and separator it is possible to notably improve safety, and the invention has been completed upon this finding.

Specifically, the present invention provides the following.

[1] A nonaqueous lithium-type power storage element comprising an electrode laminate body having a negative electrode body, a positive electrode body and a separator, and a nonaqueous electrolyte, housed in an external body, wherein the negative electrode body has a negative current collector and a negative electrode active material layer provided on one or both sides of the negative current collector, the negative electrode active material layer containing a negative electrode active material that includes a carbon material capable of occluding and releasing lithium ions, the negative electrode active material is selected from among composite porous materials having a carbonaceous material coated over activated carbon, and composite porous materials having a carbonaceous material coated over carbon black, and is doped with lithium ions at between 530 mAh/g and 2,500 mAh/g, inclusive, per unit weight of the composite porous material, the nonaqueous electrolyte contains at least 0.5 mol/L of a lithium salt based on the total amount of the nonaqueous electrolyte, and it includes at least one from among the following (a) and (b):

(a) $SO_3^{2-}$ ion (b) $SO_4^{2-}$ ion in the liquid extract when the negative electrode active material layer is extracted with water, the total amount thereof being in the range of $3.0 \times 10^{-8}$ to $5.0 \times 10^{-6}$ mol/m$^2$ per unit surface area of the negative electrode active material layer.

[2] A nonaqueous lithium-type power storage element according to [1], wherein the nonaqueous electrolyte contains $LiN(SO_2F)_2$ at a concentration of between 0.3 mol/L and 1.5 mol/L, inclusive, based on the total amount of the nonaqueous electrolyte solution.

[3] A nonaqueous lithium-type power storage element according to [1] or [2], wherein the nonaqueous electrolyte contains at least one from among $LiPF_6$ and $LiBF_4$.

[4] A nonaqueous lithium-type power storage element according to any one of [1] to [3], wherein the nonaqueous electrolyte contains an organic solvent including (a) at least one selected from among ethylene carbonate and propylene carbonate, and (b) at least one selected from among dimethyl carbonate, diethyl carbonate and ethylmethyl carbonate, and the volume ratio of (b) is at least 20% based on the total amount of the organic solvent.

[5] A nonaqueous lithium-type power storage element according to any one of [1] to [4], wherein the nonaqueous electrolyte contains an organic solvent including a compound represented by the following formula (c1):

$$R^1\text{—}O\text{—}R^2 \quad (c1)$$

{wherein $R^1$ is a halogen atom or a halogenated alkyl group with 1 to 12 carbon atoms, and $R^2$ is hydrogen atom, a halogen atom, an alkyl group with 1 to 12 carbon atoms or a halogenated alkyl group with 1 to 12 carbon atoms}.

[6] A nonaqueous lithium-type power storage element according to any one of [1] to [5], wherein the nonaqueous electrolyte contains an organic solvent including at least one compound selected from among compounds represented by the following formula (c2):

$$R^1\text{—}O\text{—}R^2 \quad (c2)$$

{wherein $R^1$ and $R^2$ each independently represent hydrogen atom, an alkyl group with 1 to 12 carbon atoms, or —Ra—O—Rb (where Ra is methylene or an alkylene group with 2 to 6 carbon atoms, and Rb is hydrogen atom or an alkyl group with 1 to 6 carbon atoms), and may be the same or different, with the proviso that $R^1$ and $R^2$ are not both hydrogen atom), and the following formula (c3):

$$R^3\text{—}OC(\text{=}O)\text{—}R^4 \quad (c3)$$

{wherein $R^3$ and $R^4$ each independently represent hydrogen atoms or an alkyl group with 1 to 12 carbon atoms, and may be the same or different}.

[7] A nonaqueous lithium-type power storage element according to [5] or [6], wherein compound (c1) in the nonaqueous electrolyte solution includes at least one type of compound selected from the group consisting of $C_2F_5OCH_3$, $C_3F_7OCH_3$, $C_4F_9OCH_3$, $C_6F_{13}OCH_3$, $C_2F_5OC_2H_5$, $C_3F_7OC_2H_5$, $C_4F_9OC_2H_5$, $C_2F_5CF(OCH_3)C_3F_7$, $CF_3CH_2OCF_2CF_2H$, $CHF_2CF_2OCH_2CF_3$, $CHF_2CF_2CH_2OCF_2CF_2H$, $CF_3CF_2CH_2OCF_2CHF_2$, $CF_3CH_2OCF_2CHFCF_3$ and $C_3HF_6CH(CH_3)OC_3HF_6$, and the volume ratio of the compounds is 0.1% to 50% based on the total amount of the organic solvent.

[8] A nonaqueous lithium-type power storage element according to [6] or [7], wherein compound (c2) in the nonaqueous electrolyte solution is at least one type of compound selected from the group consisting of 1,2-dimethoxyethane, 1,2-diethoxyethane, 1,2-dipropoxyethane, 1,2-dibutoxyethane, 1,2-ethoxymethoxy-ethane, 1,2-propoxymethoxyethane, 1,2-butoxymethoxy-ethane, 1,2-propoxyethoxyethane, 1,2-butoxyethoxyethane and 1,2-butoxypropoxyethane, and the volume ratio of the compounds is 0.1% to 50% based on the total amount of the organic solvent.

[9] A nonaqueous lithium-type power storage element according to any one of [6] to [8], wherein compound (c3) in the nonaqueous electrolyte solution includes at least one type of compound selected from the group consisting of methyl propionate, ethyl propionate, propyl propionate, butyl propionate and isobutyl propionate, and the volume ratio of the compounds is 0.1% to 50% based on the total amount of the organic solvent.

[10] A nonaqueous lithium-type power storage element according to any one of [1] to [3], wherein the nonaqueous electrolyte contains an organic solvent including (a) at least one selected from among ethylene carbonate and propylene carbonate, and (b) at least one selected from among dimethyl carbonate, diethyl carbonate and ethylmethyl carbonate, the volume ratio of (b) is at least 0.5% and less than 20% based on the total amount of the organic solvent, and the separator is a laminated separator prepared by laminating a polyolefin porous film and an insulating porous film.

[11] A nonaqueous lithium-type power storage element according to [10], wherein the flash point of the nonaqueous electrolyte is 70° C. or higher.

[12] A nonaqueous lithium-type power storage element according to [11], wherein the thickness of the polyolefin porous film of the laminated separator is between 5 μm and 35 μm, inclusive, and the ratio of the thickness of the insulating porous film with respect to that of the polyolefin porous film (thickness of insulating porous film/thickness of polyolefin porous film) is 0.25 to 1.00.

[13] A nonaqueous lithium-type power storage element according to any one of [1] to [3], wherein the nonaqueous electrolyte contains an organic solvent comprising propylene carbonate.

[14] A nonaqueous lithium-type power storage element according to any one of [1] to [13], wherein the nonaqueous electrolyte further contains at least one type of compound selected from the group consisting of sultone compounds, cyclic phosphazenes, fluorinated cyclic carbonates, cyclic carbonates, cyclic carboxylates and cyclic acid anhydrides.

[15] A nonaqueous lithium-type power storage element according to [14], wherein the sultone compound is at least one selected from among compounds represented by the following formula (1):

[Chemical Formula 1]

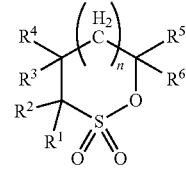

(1)

{wherein $R^1$-$R^6$ represent one selected from the group consisting of hydrogen atoms, halogen atoms, alkyl groups with 1 to 12 carbon atoms and halogenated alkyl groups with 1 to 12 carbon atoms, and may be the same or different; and n is an integer of 0 to 3}, the following formula (2):

[Chemical Formula 2]

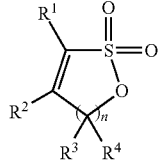

(2)

{wherein $R^1$-$R^4$ represent one selected from the group consisting of hydrogen atoms, halogen atoms, alkyl groups with 1 to 12 carbon atoms and halogenated alkyl groups with 1 to 12 carbon atoms, and may be the same or different; and n is an integer of 0 to 3}, and the following formula (3):

[Chemical Formula 3]

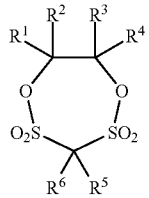

(3)

{wherein $R^1$-$R^6$ represent hydrogen atom, a halogen atom, an alkyl group with 1 to 6 carbon atoms or a halogenated alkyl group with 1 to 6 carbon atoms, and may be the same or different}, and the sultone compound is contained at 0.1 weight % to 20 weight % based on the total amount of the nonaqueous electrolyte.

[16] A nonaqueous lithium-type power storage element according to any one of [1] to [15], wherein the negative electrode active material is doped by lithium ion at between 620 mAh/g and 2,100 mAh/g, inclusive, per unit weight of the composite porous material, at the time of shipping of the nonaqueous lithium-type power storage element.

[17] A nonaqueous lithium-type power storage element according to any one of [1] to [16], wherein the negative electrode active material is a composite porous material having a carbon material coated over the surface of activated carbon, and satisfies the inequalities $0.010 \leq Vm1 \leq 0.250$, $0.001 \leq Vm2 \leq 0.200$ and $1.5 \leq Vm1/Vm2 \leq 20.0$, where $Vm1$ (cc/g) is the mesopore volume due to pores with diameters of between 20 angstrom and 500 angstrom, inclusive, as calculated by the BJH method, and $Vm2$ (cc/g) is the micropore volume due to pores with diameters of smaller than 20 angstrom as calculated by the MP method.

[18] A nonaqueous lithium-type power storage element according to any one of [1] to [16], wherein the negative electrode active material is a composite porous material having a carbon material coated over the surface of activated carbon, and is doped with lithium ion at between 1,050 mAh/g and 2,050 mAh/g, inclusive, per unit weight of the composite porous material, the weight ratio of the carbonaceous material with respect to the activated carbon being between 10% and 60%, inclusive, and the thickness of the negative electrode active material layer being between 20 μm and 45 μm, inclusive, per side.

[19] A nonaqueous lithium-type power storage element according to any one of [1] to [16], wherein the negative electrode active material satisfies all of the following (i) to (iii):

(i) the negative electrode active material is a composite porous material having a carbonaceous material coated over carbon black, (ii) the negative electrode is doped with lithium ion at between 1,050 mAh/g and 2,500 mAh/g, inclusive per unit weight of the negative electrode active material, and (iii) the thickness of the negative electrode active material layer is between 10 μm and 60 μm, inclusive, per side.

[20] A nonaqueous lithium-type power storage element according to any one of [1] to [19], wherein the positive electrode active material is activated carbon satisfying the inequalities $0.3 < V1 \leq 0.8$ and $0.5 \leq V2 \leq 1.0$, where $V1$ (cc/g) is the mesopore volume due to pores with diameters of between 20 angstrom and 500 angstrom, inclusive, as calculated by the BJH method, and $V2$ (cc/g) is the micropore volume due to pores with diameters of smaller than 20 angstrom as calculated by the MP method, and having a specific surface area of between 1,500 m²/g and 3,000 m²/g, inclusive, as measured by the BET method.

[21] A nonaqueous lithium-type power storage element according to any one of [1] to [19], wherein the positive electrode active material is activated carbon satisfying the inequality $0.8 < V1 \leq 2.5$, where $V1$ (cc/g) is the mesopore volume due to pores with diameters of between 20 angstrom and 500 angstrom, inclusive, as calculated by the BJH method, satisfying the inequality $0.8 < V2 \leq 3.0$, where $V2$ (cc/g) is the micropore volume due to pores with diameters of smaller than 20 angstrom as calculated by the MP method, and having a specific surface area of between 3,000 m²/g and 4,000 m²/g, inclusive, as measured by the BET method.

[22] A nonaqueous lithium-type power storage element comprising an electrode laminate body having a negative electrode body, a positive electrode body and a separator, and a nonaqueous electrolyte, housed in an external body, wherein the negative electrode body has a negative current collector and a negative electrode active material layer provided on one or both sides of the negative current collector, the negative electrode active material layer containing a negative electrode active material that includes a carbon material capable of occluding and releasing lithium ions, the negative electrode active material is a composite porous material having a carbonaceous material coated over activated carbon and/or a composite porous material having a carbonaceous material coated over carbon black, and is doped with lithium ions at between 530 mAh/g and 2,500 mAh/g, inclusive, per unit weight of the composite porous material, the nonaqueous electrolyte contains at least 0.5 mol/L of a lithium salt based on the total amount of the nonaqueous electrolyte, and includes at least one from among the following (a) and (b):

(a) $SO_3^{2-}$ ion (b) $SO_4^{2-}$ ion in the liquid extract when the negative electrode active material layer is extracted with water, the total amount thereof being in the range of $3.0 \times 10^{-8}$ to $5.0 \times 10^{-6}$ mol/m² per unit surface area of the negative electrode active material layer, and in the nonaqueous lithium-type power storage element, where $Rb$ (Ω) is the internal resistance at 25° C. after storage for 2 months at a cell voltage of 4 V and in an environmental temperature of 60° C., $Ra$ (Ω) is the internal resistance at 25° C. before such storage, $Rc$ (Ω) is the internal resistance at −30° C. before such storage, and $F$ (F) is the capacitance at 25° C. before such storage, all of the following (a) to (d) are simultaneously satisfied:

(a) the product of $Ra$ and $F$, $Ra \cdot F$ is 1.9 or smaller, (b) $Rb/Ra$ is 1.8 or smaller, (c) the gas quantity generated upon storage for 2 months at a cell voltage of 4 V and in an environmental temperature of 60° C. is no greater than $13 \times 10^{-3}$ cc/F at 25° C., and (d) the product of $Rc$ and $F$, $Rc \cdot F$ is 24 or smaller.

The nonaqueous lithium-type power storage element of the invention has excellent electrochemical properties and durability in a wide temperature range, as well as excellent safety.

The nonaqueous lithium-type power storage element is suitable as a lithium ion capacitor for purposes in the field of hybrid drive systems that combine automobile internal combustion engines, fuel cells or motors with power storage elements, and in assist power sources for instantaneous electric power peaks.

DETAILED DESCRIPTION OF THE INVENTION

An embodiment of the invention will now be explained in detail, with the understanding that the invention is not limited to the embodiment.

[Power Storage Element]

This embodiment of the invention is a nonaqueous lithium-type power storage element. The power storage element comprises an electrode laminate body having a negative electrode body, a positive electrode body and a separator, and a nonaqueous electrolyte, housed in an external body.

The negative electrode body has a negative current collector, and a negative electrode active material layer provided on one or both sides of the negative current collector. The negative electrode active material layer contains a negative electrode active material including a carbon material that can occlude and release lithium ions.

The positive electrode body has
a positive current collector, and
a positive electrode active material layer provided on one or both sides of the positive current collector. The positive electrode active material layer contains a positive electrode active material including activated carbon.

The nonaqueous lithium-type power storage element according to one embodiment of the invention, where $Rb$ ($\Omega$) is the internal resistance at 25° C. after storage for 2 months at a cell voltage of 4 V and in an environmental temperature of 60° C., $Ra$ ($\Omega$) is the internal resistance at 25° C. before such storage, $Rc$ ($\Omega$) is the internal resistance at −30° C. before such storage, and $F$ (F) is the capacitance at 25° C. before such storage, preferably simultaneously satisfies all of the following (a) to (d):

(a) the product of Ra and F, Ra·F is 1.9 or smaller,
(b) Rb/Ra is 1.8 or smaller,
(c) the gas quantity generated upon storage for 2 months at a cell voltage of 4 V and in an environmental temperature of 60° C. is no greater than $13 \times 10^{-3}$ cc/F at 25° C., and
(d) the product of Rc and F, Rc·F is 24 or smaller.

The capacitance F (F) referred to here is the value calculated by F=Q/(3.8 to 2.2), using the capacity Q with charging to 3.8 V by constant-current/constant-voltage charge ensuring a constant-voltage charge time of 1 hour at a current value of 1.5 C, followed by constant-current discharge to 2.2 V at a current value of 1.5 C. Internal resistance values Ra ($\Omega$), Rb ($\Omega$) and Rc ($\Omega$) are values obtained by the following respective methods. First, the constant-current charge is performed at a prescribed environmental temperature (25° C. or −30° C.), to 3.8 V at a current value of 1.5 C, and then constant-current/constant-voltage charge is performed with application of a constant voltage of 3.8 V for a total of 2 hours, and followed by constant-current discharge to 2.2 V at a current value of 50 C, and a discharge curve (time-voltage) is obtained. From the discharge curve, with a voltage of E0 at discharge time=0 seconds, obtained by extrapolating an approximate straight line from the voltage values at discharge time points of 2 seconds and 4 seconds, the value is calculated from voltage drop ($\Delta E$)=3.8−E0 and R=$\Delta E$/(50 C (current value)).

The phrase "storage for 2 months at a cell voltage of 4.0 V" means storage for 2 months in state with the cell voltage of 4.0 V being essentially maintained. Specifically, this method maintains a cell voltage of 4.0 V by application of a constant voltage of 4.0 V with a current value of 2.0 C, by constant-current/constant-voltage charge before storage and each week after initial storage, for 2 hours each time.

The product Ra·F is preferably no greater than 1.9, more preferably no greater than 1.8 and even more preferably no greater than 1.6, from the viewpoint of allowing sufficient charge capacity and discharge capacity to be exhibited for high current. If Ra·F is below this upper limit, it will be possible to obtain a power storage element having an excellent input/output characteristic. This is therefore preferred since, by combining a power storage system using a power storage element with a high efficiency engine, for example, it will be possible to adequately withstand the high load applied to the power storage element.

The product Rc·F is preferably no greater than 24, more preferably no greater than 20 and even more preferably no greater than 18, from the viewpoint of allowing sufficient charge capacity and discharge capacity to be exhibited even in a low temperature environment of −30° C. If Rc·F is below this upper limit, it will be possible to obtain a power storage element having an excellent input/output characteristic even in a low temperature environment. This will allow a power storage element to be obtained that can provide adequate electric power to drive a motor during start-up of an automobile or motorcycle engine in a low temperature environment.

The value of Rb/Ra is preferably no greater than 1.8, more preferably no greater than 1.6 and even more preferably no greater than 1.4, from the viewpoint of allowing sufficient charge capacity and discharge capacity to be exhibited for high current, even upon exposure to a high-temperature environment for a prolonged period. If Rb/Ra is below this upper limit it will be possible to stably obtain an excellent output characteristic for long periods, thus helping to prolong the usable life of the device.

The gas quantity generated upon storage for 2 months at a cell voltage of 4.0 V and in an environmental temperature of 60° C. is preferably no greater than $13 \times 10^{-3}$ cc/F, more preferably no greater than $10 \times 10^{-3}$ cc/F and even more preferably no greater than $5.0 \times 10^{-3}$ cc/F, as the value measured at 25° C., from the viewpoint of avoiding reduced properties of the element by the generated gas. If the generated gas quantity under these conditions is less than this upper limit, there will be no risk of expansion of the cell by gas generation when the device is exposed to high temperature for prolonged periods. It will thus be possible to obtain a power storage element having sufficient safety and durability.

Since the power storage element provided by this embodiment of the invention exhibits the low Ra·F, Rc·F and Rb/Ra values and low generated gas quantity described above, its element characteristics are of a superior level that cannot be obtained in the prior art. An example of means for achieving such low Ra·F, Rc·F and Rb/Ra values and low generated gas quantity is application of the specific nonaqueous electrolyte composition explained below.

[Electrolyte]

The electrolyte for this embodiment of the invention is a nonaqueous electrolyte. The electrolyte includes a nonaqueous solvent as described below.

The nonaqueous electrolyte contains a lithium salt dissolved at a concentration of 0.5 mol/L or greater based on the total amount of the nonaqueous electrolyte. The value is preferably 0.8 mol/L or greater, and more preferably 1.0 to 1.5 mol/L.

The nonaqueous electrolyte preferably contains, as the electrolyte salt, a lithium salt that can generate at least one type of sulfite ion or sulfate ion selected from the group consisting of lithium bisfluorosulfonylimide ($LiN(SO_2F)_2$), $LiN(SO_2CF_3)_2$, $LiN(SO_2 C_2F_5)_2$, $LiN(SO_2CF_3)(SO_2 C_2F_5)$, $LiN(SO_2CF_3)(SO_2C_2F_4H)$, $LiC(SO_2F)_3$, $LiC(SO_2CF_3)_3$, $LiC(SO_2 C_2F_5)_3$, $LiCF_3SO_3$ and $LiC_4F_9SO_3$. Preferred among these is $LiN(SO_2F)_2$.

The concentration of lithium salts that can generate sulfite ion or sulfate ion in the nonaqueous electrolyte solution of this embodiment is preferably between 0.3 mol/L and 1.5 mol/L, inclusive, and more preferably between 0.6 mol/L and 1.2 mol/L, inclusive. If the concentration of lithium salts is 0.3 mol/L or greater, the ion conductivity of the electrolyte will be increased, and at least one of the sulfite ions or sulfate ions will appropriately accumulate on the negative electrode electrolyte layer, allowing gas generation by decomposition of the electrolytes to be reduced. If the value is 1.5 mol/L or lower, on the other hand, deposition of the electrolyte salt during charge-discharge will not take place and viscosity increase of the electrolytes will not be caused even after elapse of long periods.

The nonaqueous electrolyte may contain only a lithium salt that can generate a sulfite ion or a sulfate ion, as the electrolyte salt, or it may further contain other electrolyte salts.

As other electrolyte salts to be contained in the nonaqueous electrolyte, there may be used fluorine-containing lithium salts other than those mentioned above, having solubility of 0.5 mol/L or greater in the nonaqueous electrolyte. Examples of suitable lithium salts include $LiPF_6$ and $LiBF_4$, as well as mixtures of these salts. From the viewpoint of exhibiting high conductivity, as other electrolyte salts it is preferred to use at least one selected from among $LiPF_6$ and $LiBF_4$, and most preferably $LiPF_6$.

When another electrolyte salt is to be used in the nonaqueous electrolyte of this embodiment, the amount of other electrolyte salt used is preferably 0 parts by mole to 80 parts by mole, more preferably 5 parts by mole to 65 parts by mole and even more preferably 10 parts by mole to 50 parts by mole, where 100 parts by mole is the total amount of the lithium salt that can generate sulfite ion or sulfate ion, and the other electrolyte salt. The amount of other electrolyte salt used is preferably within this range since decomposition of the electrolyte at high temperature will be minimized, thereby allowing gas generation and resistance increase to be reduced, while also allowing corrosion of the positive current collector to be minimized.

The organic solvent of the nonaqueous electrolyte for this embodiment is preferably one of the following three modes.

The first is a mode in which the organic solvent of the nonaqueous electrolyte of the invention includes:

(a) at least one selected from among ethylene carbonate and propylene carbonate, and (b) at least one selected from among dimethyl carbonate, diethyl carbonate and ethylmethyl carbonate, and the volume ratio of (b) is at least 20% based on the total amount of the organic solvent.

If the volume ratio of (b) is at least 20% based on the total amount of the organic solvent, it will be possible to maintain high conductivity while keeping a low viscosity. The volume ratio of (b) is more preferably 30% or greater and even more preferably 35% or greater, based on the total amount of the organic solvent.

The second is a mode in which the organic solvent of the nonaqueous electrolyte of this embodiment includes:

(a) at least one selected from among ethylene carbonate and propylene carbonate, and (b) at least one selected from among dimethyl carbonate, diethyl carbonate and ethylmethyl carbonate, and the volume ratio of (b) is at least 0.5% and less than 20%, based on the total amount of the organic solvent.

If the volume ratio of (b) is less than 20% based on the total amount of the organic solvent, the flash point of the electrolyte can be a high temperature, thus allowing high safety to be exhibited due to a flame-retardant effect. If the volume ratio of (b) is at least 0.5% based on the total amount of the organic solvent, it will be possible to maintain high conductivity and a low viscosity of the electrolyte. The volume ratio of (b) is more preferably between 1% and 15%, inclusive, and even more preferably between 2% and 10%, inclusive, based on the total amount of the organic solvent.

From the viewpoint of being able to exhibit high durability during storage at high temperature, (b) is preferably at least one selected from among diethyl carbonate and ethylmethyl carbonate.

The nonaqueous electrolyte of this embodiment preferably has a flash point of 70° C. or higher. The flash point can be measured by the Tag closed-cup method specified in JIS K 2265-1-2007, the Setaflash method specified in JIS K 2265-2-2007, or the Cleveland open-cup method specified in JIS K 2265-4-2007. A high flash point of the electrolyte will impart a flame-retardant effect to the obtained power storage element, allowing high safety to be exhibited. The flash point of the nonaqueous electrolyte is therefore more preferably 75° C. or higher.

The upper limit for the flash point of the nonaqueous electrolyte is not particularly restricted. However, considering the electrical characteristics of the obtained power storage element and the availability of the organic solvent, the upper limit may be a numerical value of no higher than 150° C., for example.

Third, the organic solvent of the nonaqueous electrolyte for this embodiment may comprise propylene carbonate.

From the viewpoint of allowing a high flame retardant effect to be exhibited, preferably propylene carbonate alone is used as the organic solvent. When propylene carbonate is used as the organic solvent, it is possible to obtain both flame retardance and high ion conductance by adjusting the concentrations of the lithium salt that can generate a sulfite ion or sulfate ion, and the other electrolyte salt.

The nonaqueous electrolyte of this embodiment preferably further contains at least one type of compound represented by the following formula (c1):

$$R^1\text{—}O\text{—}R^2 \quad (c1)$$

{wherein $R^1$ is a halogen atom or a halogenated alkyl group with 1 to 12 carbon atoms, and $R^2$ is hydrogen atom, a halogen atom, an alkyl group with 1 to 12 carbon atoms or a halogenated alkyl group with 1 to 12 carbon atoms}.

The compound represented by formula (c1) above (compound (c1)) in the nonaqueous electrolyte of this embodiment may be, for example or a hydrofluoroether such as $CF_3OCH_3$, $CF_3OCF_3$, $CF_3CH_2OCH_3$, $C_2F_5OCH$, $C_2F_5OCF_3$, $C_2F_5OC_2H_5$, $C_2F_5OC_2F_5$, $CF_3CH_2OC_2H_5$, $C_3F_7OCH_3$, $C_3F_7OC_2H_5$, $C_4F_9OCH_3$, $C_4F_9OC_2H_5$, $C_4F_9OC_3H_7$, $C_4F_9OC_4H_9$, $C_5F_{11}OCH_3$, $C_5F_{11}OC_2H_5$, $C_5F_{11}OC_3H_7$, $C_5F_{11}OC_4H_9$, $C_5F_{11}OC_5H_{11}$, $C_6F_{13}OCH_3$, $C_6F_{13}OC_2H_5$, $C_6F_{13}OC_3H_7$, $C_6F_{13}OC_4H_9$, $C_6F_{13}OC_5H_{11}$, $C_6F_{13}OC_6H_{13}$, $C_2F_5CF(OCH_3)C_3F_7$, $C_2F_5OCF_2CF_2H$, $CHF_3CF_2OCH_2CF_3$, $CHF_2CF_2CH_2OCF_2CF_2H$, $C_2F_5CH_2OCF_2CHF_2$, $CF_3CH_2OCF_2CHFCF_3$ or $C_3HF_6CH(CH_3)OC_3HF_6$, and preferably at least one selected from this group is used.

The content of compound (c1) is preferably 0.1% to 50% and more preferably 1% to 40%, as the volume ratio based on the total amount of the organic solvent. If the content of compound (c1) is 1% or greater, the obtained electrolyte may be expected to have a high level of flame-retardant safety. If the content of compound (c1) is 40% or less, on the other hand, it will be possible to maintain a low viscosity for the electrolyte. This will allow high ion conductivity to be maintained for the electrolyte, so that a high level of input/output characteristic can be exhibited. The content of compound (c1) is preferably 0.1% to 55% and more preferably 1% to 45%, when expressed as the weight ratio based on the total amount of the organic solvent.

The nonaqueous electrolyte of this embodiment more preferably contains at least one compound selected from among compounds represented by the following formula (c2):

$$R^1\text{—}O\text{—}R^2 \quad (c2)$$

{wherein $R^1$ and $R^2$ each independently represent hydrogen atom, an alkyl group with 1 to 12 carbon atoms, or —Ra—

O—Rb (where Ra is methylene group or an alkylene group with 2 to 6 carbon atoms, and Rb is hydrogen atom or an alkyl group with 1 to 6 carbon atoms), and may be the same or different, with the proviso that $R^1$ and $R^2$ are not both hydrogen atoms}, and the following formula (c3):

$$R^3\text{—OC}(\text{=}O)\text{—}R^4 \quad (c3)$$

{wherein $R^3$ and $R^4$ each independently represent hydrogen atom or an alkyl group with 1 to 12 carbon atoms, and may be the same or different}.

In the nonaqueous electrolyte of this embodiment, the compound represented by formula (c2) (compound (c2)) may be, for example, a linear ether compound such as 1,2-dimethoxyethane, 1,2-diethoxyethane, 1,2-dipropoxyethane, 1,2-dibutoxyethane, 1,2-ethoxymethoxyethane, 1,2-propoxymethoxyethane, 1,2-butoxymethoxyethane, 1,2-propoxyethoxyethane, 1,2-butoxyethoxyethane or 1,2-butoxypropoxyethane, and preferably at least one selected from this group is used.

The compound represented by formula (c3) (compound (c3)) may be, for example, a linear carboxylic acid ester compound such as methyl formate, ethyl formate, propyl formate, butyl formate, isobutyl formate, methyl acetate, ethyl acetate, propyl acetate, butyl acetate, isobutyl acetate, methyl propionate, ethyl propionate, propyl propionate, butyl propionate, isobutyl propionate, methyl butyrate, ethyl butyrate, propyl butyrate, butyl butyrate, isobutyl butyrate, methyl isobutyrate, ethyl isobutyrate, propyl isobutyrate, butyl isobutyrate, isobutyl isobutyrate, methyl valerate, ethyl valerate, propyl valerate, butyl valerate, isobutyl valerate, methyl isovalerate, ethyl isovalerate, propyl isovalerate, butyl isovalerate or isobutyl isovalerate, and preferably at least one selected from this group is used.

For this embodiment, one each of compound (c2) or compound (c3) may be used alone, or compound (c2) and compound (c3) may be used in combination.

When compound (c2) and compound (c3) are used in combination, the proportion of use is preferably 20 to 90%, more preferably 30 to 85% and even more preferably 40 to 80% as the volume ratio of compound (c2) with respect to the total of compound (c2) and compound (c3). When the proportion of compound (c2) and compound (c3) used is expressed as a weight ratio, it is preferably 20 to 90%, more preferably 30 to 85% and even more preferably 40 to 80% as the weight ratio of compound (c2) with respect to the total of compound (c2) and compound (c3).

When compound (c2) and compound (c3) are used in combination, their total content is preferably 0.1% to 50% and more preferably 1% to 40%, as the volume ratio based on the total amount of the organic solvent. If their total content is no smaller than the aforementioned lower limit, the obtained electrolyte will be able to maintain high ion conductivity even at low temperature, so that a high level of input/output characteristic can be exhibited even in low temperature environments. If their total content is no greater than the aforementioned upper limit, it will be possible to minimize reductive decomposition of the electrolyte at the negative electrode, thereby allowing a power storage element with high durability at high temperature to be obtained. In addition, the solubility of the electrolyte salt in the electrolyte can be satisfactorily maintained and high ion conductivity maintained for the nonaqueous electrolyte, thereby allowing a high input/output characteristic to be exhibited. Their total content is preferably 0.1% to 45% and more preferably 1% to 35%, when expressed as the weight ratio based on the total amount of the organic solvent.

The nonaqueous electrolyte of this embodiment preferably further contains, as an additive, at least one type of compound selected from the group consisting of sultone compounds, cyclic phosphazenes, fluorinated cyclic carbonates, cyclic carbonates, cyclic carboxylates and cyclic acid anhydrides.

The sultone compound used is preferably at least one sultone compound selected from among compounds represented by
the following formula (1):

[Chemical Formula 4]

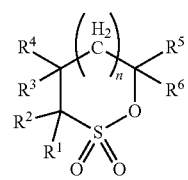

(1)

{wherein $R^1$-$R^6$ represent any selected from the group consisting of hydrogen atoms, halogen atoms, alkyl groups with 1 to 12 carbon atoms and halogenated alkyl groups with 1 to 12 carbon atoms, and may be the same or different; and n is an integer of 0 to 3},
the following formula (2):

[Chemical Formula 5]

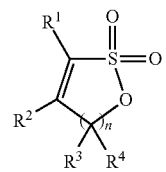

(2)

{wherein $R^1$-$R^4$ represent any selected from the group consisting of hydrogen atoms, halogen atoms, alkyl groups with 1 to 12 carbon atoms and halogenated alkyl groups with 1 to 12 carbon atoms, and may be the same or different; and n is an integer of 0 to 3}, and
the following formula (3):

[Chemical Formula 6]

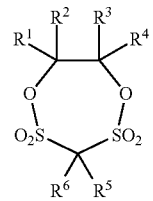

(3)

{wherein $R^1$-$R^6$ represent hydrogen atom, a halogen atom, an alkyl group with 1 to 6 carbon atoms or a halogenated alkyl group with 1 to 6 carbon atoms, and may be the same or different}.

Examples of halogen atoms for $R_1$-$R_6$ in all of formulas (1) to (3) include fluorine atom, chlorine atom and iodine atom; examples of alkyl groups include methyl group, ethyl group and propyl group; and examples of halogenated alkyl groups include fluoroalkyl group and perfluoroalkyl group.

The letters n in formulas (1) and (2) each independently are preferably an integer of 0 to 2 and more preferably an integer of 0 or 1.

The sultone compound in the nonaqueous electrolyte of this embodiment is preferably one or more sultone compounds selected from the group consisting of 1,3-propanesultone, 2,4-butanesultone, 1,4-butanesultone, 1,3-butanesultone or 2,4-pentanesultone, 1,3-propenesultone or 1,4-butenesultone, 1,5,2,4-dioxadithiepane 2,2,4,4-tetraoxide, methylenebis(benzenesulfonic acid), methylenebis(phenylmethanesulfonic acid), methylenebis(ethanesulfonic acid), methylenebis(2,4,6-trimethylbenzenesulfonic acid) and methylenebis(2-trifluoromethylbenzenesulfonic acid), from the viewpoint of minimal adverse effect on resistance, and reducing decomposition of the nonaqueous electrolyte at high temperature to minimize gas generation.

The content of the sultone compound in the nonaqueous electrolyte is preferably 0.1 weight % to 20 weight % based on the total amount of the nonaqueous electrolyte. If the value is 0.1 weight % or greater, it will be possible to minimize decomposition of the electrolyte at high temperature and to reduce gas generation. If the value is no greater than 20 weight %, on the other hand, it will be possible to suppress lowering of the ion conductivity of the electrolyte, and to maintain a high input/output characteristic. For these reasons, the content of the sultone compound is preferably between 5 weight % and 15 weight %, inclusive and even more preferably between 7 weight % and 12 weight %, inclusive. Such sultone compounds can be used alone or in mixtures of two or more.

Examples of cyclic phosphazenes include ethoxypentafluorocyclotriphosphazene, diethoxytetrafluorocyclotriphosphazene and phenoxypentafluorocyclotriphosphazene, and preferably one or more selected from these is used.

The content of the cyclic phosphazene in the nonaqueous electrolyte is preferably 0.5 weight % to 20 weight % based on the total amount of the nonaqueous electrolyte. If the value is 0.5 wt % or greater, it will be possible to minimize decomposition of the electrolyte at high temperature and to reduce gas generation. If the value is no greater than 20 weight %, on the other hand, it will be possible to suppress lowering of the ion conductivity of the electrolyte, and to maintain a high input/output characteristic. For these reasons, the cyclic phosphazene content is preferably between 2 weight % and 15 weight %, inclusive and even more preferably between 4 weight % and 12 weight %, inclusive. These cyclic phosphazenes may be used alone, or two or more may be used in admixture.

The fluorinated cyclic carbonate used is preferably one selected from among flueroethylene carbonate (FEC) and difluoroethylene carbonate (dFEC), from the viewpoint of compatibility with other nonaqueous solvents.

The content of the fluorine-containing cyclic carbonate is preferably between 0.5 weight % and 10 weight %, inclusive, and more preferably between 1 weight % and 5 weight %, inclusive, with respect to the total amount of the non-aqueous electrolyte. If the fluorine-containing cyclic carbonate content is 0.5 weight % or higher, it will be possible to form a satisfactory coating film on the negative electrode, and reductive decomposition of the electrolyte on the negative electrode will be minimized, to obtain a power storage element with high durability at high temperature. If the fluorine-containing cyclic carbonate content is 10 weight % or lower, on the other hand, the electrolyte salt solubility will be kept satisfactory and high ion conductivity of the nonaqueous electrolyte will be maintained, thus allowing a high input/output characteristic to be exhibited. These fluorine-containing cyclic carbonates may be used alone or as a mixture of two or more types.

The cyclic carbonate is preferably vinylene carbonate.

The content of the cyclic carbonate is preferably between 0.5 weight % and 10 weight %, inclusive, and more preferably between 1 weight % and 5 weight %, inclusive, with respect to the total amount of the nonaqueous electrolyte. If the cyclic carbonate content is 0.5 weight % or higher, it will be possible to form a satisfactory coating film on the negative electrode, and reductive decomposition of the electrolyte on the negative electrode will be minimized, to obtain a power storage element with high durability at high temperature. If the cyclic carbonate content is 10 weight % or lower, on the other hand, the electrolyte salt solubility will be kept satisfactory and high ion conductivity of the nonaqueous electrolyte will be maintained, thus allowing a high input/output characteristic to be exhibited.

Examples of cyclic carboxylates include γ-butyrolactone, γ-valerolactone, γ-caprolactone and ε-caprolactone, and preferably at least one selected from these is used. Particularly preferred among these is γ-butyrolactone, from the viewpoint of improving the cell characteristic due to improved lithium ion dissociation.

The content of the cyclic carboxylate is preferably between 0.5 weight % and 15 weight %, inclusive, and more preferably between 1 weight % and 5 weight %, inclusive, with respect to the total amount of the nonaqueous electrolyte. If the cyclic acid anhydride content is 0.5 weight % or higher, it will be possible to form a satisfactory coating film on the negative electrode, and reductive decomposition of the electrolyte on the negative electrode will be minimized, to obtain a power storage element with high durability at high temperature. If the cyclic carboxylate content is 5 weight % or lower, on the other hand, the electrolyte salt solubility will be kept satisfactory and high ion conductivity of the nonaqueous electrolyte will be maintained, thus allowing a high input/output characteristic to be exhibited. These cyclic carboxylates may be used alone, or two or more may be used in admixture.

The cyclic acid anhydride is preferably one or more selected from among succinic anhydride, maleic anhydride, citraconic anhydride and itaconic anhydride. Selection is most preferably made from succinic anhydride and maleic anhydride, from the viewpoint of ready industrial availability to reduce production cost of the electrolyte, and from the viewpoint of easier dissolution in the nonaqueous electrolyte.

The content of the cyclic acid anhydride is preferably between 0.5 weight % and 15 weight %, inclusive, and more preferably between 1 weight % and 10 weight %, inclusive, with respect to the total amount of the nonaqueous electrolyte. If the cyclic acid anhydride content is 0.5 weight % or higher, it will be possible to form a satisfactory coating film on the negative electrode, and reductive decomposition of the electrolyte on the negative electrode will be minimized, to obtain a power storage element with high durability at high temperature. If the cyclic acid anhydride content is 10 weight % or lower, on the other hand, the electrolyte salt solubility will be kept satisfactory and high ion conductivity of the nonaqueous electrolyte will be maintained, thus allowing a high input/output characteristic to be exhibited. These cyclic acid anhydrides may be used alone, or two or more may be used in admixture.

As additives in the nonaqueous electrolyte of this embodiment, a sultone compound may be used alone; or a sultone compound may be used together with at least one type of compound selected from the group consisting of cyclic phosphazenes, fluorinated cyclic carbonates, cyclic carbonates, cyclic carboxylates and cyclic acid anhydrides. In the latter case, it is preferred to use a sultone compound and a cyclic phosphazene in combination.

[Positive Electrode Body and Negative Electrode Body]

The positive electrode body in the nonaqueous lithium-type power storage element of this embodiment has a positive current collector, and a positive electrode active material layer provided on one or both sides of the positive current collector. The positive electrode active material layer contains a positive electrode active material including activated carbon.

The negative electrode body has a negative current collector, and a negative electrode active material layer provided on one or both sides of the negative current collector. The negative electrode active material layer contains a negative electrode active material including a carbon material that can occlude and release lithium ions.

In the electrode bodies of the positive electrode and negative electrode of this embodiment, the same construction is used for the constituent elements other than the positive electrode active material and the negative electrode active material. The positive electrode active material and negative electrode active material will be described in order, followed by a summary of their common elements.

[Positive Electrode Active Material]

The positive electrode active material includes activated carbon. The positive electrode active material used may be activated carbon alone, or another material mentioned below may be used in addition to activated carbon. The activated carbon content based on the total amount of the positive electrode active material is preferably 50 weight % or greater and more preferably 70 weight % or greater. The content may even be 100 weight %, but from the viewpoint of obtaining a satisfactory effect by combined use with other materials, it is preferably, for example, no greater than 90 weight %, and may even be 80 weight % or lower.

There are no particular restrictions on the type of activated carbon or its starting material, for the positive electrode active material, but preferably the pores of the activated carbon are optimally controlled to obtain both high input/output characteristics and high energy density. Specifically, if $V1$ (cc/g) is the mesopore volume due to pores with diameters of between 20 angstrom and 500 angstrom, inclusive, as calculated by the BJH method, and $V2$ (cc/g) is the micropore volume due to pores with diameters of smaller than 20 angstrom as calculated by the MP method:

(1) for high input/output characteristics, there is preferred activated carbon satisfying the inequalities $0.3<V1\leq0.8$ and $0.5\leq V2\leq1.0$, and exhibiting a specific surface area of between 1,500 m$^2$/g and 3,000 m$^2$/g, inclusive, as measured by the BET method (hereunder also referred to as "activated carbon 1"), and (2) to obtain high energy density, there is preferred activated carbon satisfying the inequalities $0.8<V1\leq2.5$ and $0.8<V2\leq3.0$, and exhibiting a specific surface area of between 3,000 m$^2$/g and 4,000 m$^2$/g, inclusive, as measured by the BET method (hereunder also referred to as "activated carbon 2").

The (1) activated carbon 1 and (2) activated carbon 2 will each be explained in order.

[Activated Carbon 1]

The mesopore volume $V1$ of activated carbon 1 is preferably a value larger than 0.3 cc/g, from the viewpoint of satisfactory input/output characteristics when the positive electrode material has been incorporated into a power storage element. On the other hand, the mesopore volume is also preferably no greater than 0.8 cc/g from the viewpoint of minimizing reduction in the bulk density of the positive electrode. The value of $V1$ is more preferably between 0.35 cc/g and 0.7 cc/g, inclusive and even more preferably between 0.4 cc/g and 0.6 cc/g, inclusive.

The micropore volume $V2$ of activated carbon 1 is preferably 0.5 cc/g or greater in order to increase specific surface area of the activated carbon and increase capacity. From the viewpoint of reducing the bulk of the activated carbon, increasing the density as an electrode and increasing the capacity per unit volume, on the other hand, the micropore volume is also preferably no greater than 1.0 cc/g. The value of $V2$ is more preferably between 0.6 cc/g and 1.0 cc/g, inclusive and even more preferably between 0.8 cc/g and 1.0 cc/g, inclusive.

The ratio ($V1/V2$) of the mesopore volume $V1$ with respect to the micropore volume $V2$ is preferably in the range of $0.3\leq V1/V2\leq0.9$. The value of $V1/V2$ is preferably 0.3 or greater from the viewpoint of increasing the ratio of the mesopore volume to the micropore volume to a degree allowing reduction in the output characteristics to be minimized while obtaining high capacity. On the other hand, $V1/V2$ is also preferably no greater than 0.9 from the viewpoint of increasing the ratio of the micropore volume to the mesopore volume to a degree allowing reduction in the capacity to be minimized while obtaining high output characteristics. A more preferred range for $V1/V2$ is $0.4\leq V1/V2\leq0.7$, and an even more preferred range for $V1/V2$ is $0.55\leq V1/V2\leq0.7$.

According to the invention, the micropore volume and mesopore volume are the values determined by the methods described below. A sample is vacuum dried at 500° C. for a day and a night, and the adsorption/desorption isotherm is measured using nitrogen as the adsorbate. The isotherm at the desorption side is used for calculation of the micropore volume by the MP method and the mesopore volume by the BJH method.

The MP method is a method in which the "t-plot method" (B. C. Lippens, J. H. de Boer, J. Catalysis, 4319(1965)) is utilized to determine micropore volume, micropore area and micropore distribution, and it is the method proposed by M. Mikhail, Brunauer and Bodor (R. S. Mikhail, S. Brunauer, E. E. Bodor, J. Colloid Interface Sci., 26, 45 (1968)).

The BJH method is a method of calculation commonly used for analysis of mesopores, and it was advocated by Barrett, Joyner, Halenda et al. (E. P. Barrett, L. G. Joyner and P. Halenda, J. Am. Chem. Soc., 73, 373(1951)).

The mean pore size of the activated carbon 1 is preferably 17 angstrom or greater, more preferably 18 angstrom or greater and even more preferably 20 angstrom or greater, from the viewpoint of maximizing the output of the obtained power storage element. From the viewpoint of maximizing the capacity of the obtained power storage element, on the other hand, the mean pore size of the activated carbon 1 is preferably no greater than 25 angstrom. The "mean pore size", as used herein, is the value determined by dividing the total pore volume per weight of a sample, as obtained by measuring the equilibrium adsorption volumes of nitrogen gas under different relative pressures at the temperature of liquid nitrogen, by the BET specific surface area.

The BET specific surface area of the activated carbon 1 is preferably between 1,500 m$^2$/g and 3,000 m$^2$/g, inclusive, and more preferably between 1,500 m²/g and 2,500 m²/g, inclusive. If the BET specific surface area is 1,500 m²/g or greater it will be easier to obtain satisfactory energy density, and if the BET specific surface area is 3,000 m²/g or lower there will be no need to add large amounts of a binder to maintain the strength of the electrode, and therefore the performance per volume of the electrode will tend to be higher.

The activated carbon 1 having such features can be obtained, for example, using the starting material and treatment method described below.

For this embodiment of the invention, the carbon source used as the starting material for the activated carbon 1 is not particularly restricted, and examples include plant-based starting materials such as wood, wood dust, coconut shell, by-products of pulp production, bagasse and molasses; fossil-based starting materials such as peat, lignite, brown coal, bituminous coal, anthracite, petroleum distillation residue components, petroleum pitch, coke and coal tar; various synthetic resins such as phenol resin, vinyl chloride resin, vinyl acetate resin, melamine resin, urea resin, resorcinol resin, celluloid, epoxy resin, polyurethane resin, polyester resin and polyamide resin; synthetic rubbers such as polybutylene, polybutadiene and polychloroprene; and other synthetic wood or synthetic pulp materials, as well as carbides of the foregoing. From the viewpoint of mass production and of cost, of these starting materials there are preferred plant-based starting materials such as coconut shell and wood dust, and their carbides, and there are particularly preferred coconut shell carbides.

The system used for carbonization and activation of these starting materials to obtain the activated carbon 1 may be a known system such as, for example, a fixed bed system, moving bed system, fluidized bed system, slurry system or rotary kiln system.

The carbonization method for these starting materials is a method in which an inert gas such as, for example, nitrogen, carbon dioxide, helium, argon, xenon, neon, carbon monoxide or exhaust gas, or a mixed gas composed mainly of such inert gases with other gases, is used for firing at about 400 to 700° C. (preferably 450 to 600° C.), over a period of about 30 minutes to 10 hours.

The activation method for a carbide obtained by the carbonization method is preferably, for example, a gas activation method in which an activating gas such as water vapor, carbon dioxide or oxygen is used for firing. A method using water vapor or carbon dioxide as the activating gas is preferred.

In this activation method, preferably the activating gas is supplied at a rate of 0.5 to 3.0 kg/h (preferably 0.7 to 2.0 kg/h) while the carbide is raised to a prescribed final temperature (for example, 800 to 1,000° C.) over a period of 3 to 12 hours (preferably 5 to 11 hours and even more preferably 6 to 10 hours), for activation.

The carbide may be subjected to a primary activation before activation treatment of the carbide. In the primary activation, the carbon material may be fired at a temperature of below 900° C. using an activating gas such as water vapor, carbon dioxide or oxygen, for example, for gas activation.

By appropriate combinations for the firing temperature and firing time for the carbonization method, and the activating gas supply rate, temperature-elevating rate and maximum activation temperature in the activation method, it is possible to produce activated carbon 1 having the features described above, that may be used for this embodiment.

The mean particle size of the activated carbon 1 is preferably 1 to 20 μm. The term "mean particle size" as used herein refers to the particle diameter obtained upon determining a cumulative curve with the total volume at 100% with measurement of the particle size distribution using a particle size distribution analyzer, where the cumulative curve is 50% (that is, the 50% diameter (median diameter)). The mean particle size can be measured with a commercially available laser diffraction-type particle size distribution analyzer.

If the mean particle size is 1 μm or greater, the capacity per electrode volume will tend to be higher due to the higher density of the active material layer. A small mean particle size may lead to the disadvantage of low durability, but a mean particle size of at least 1 μm will help avoid this disadvantage. A mean particle size of no larger than 20 μm, on the other hand, will tend to be more suitable for high-speed charge-discharge. The mean particle size is more preferably 2 to 15 μm and even more preferably 3 to 10 μm.

[Activated Carbon 2]

The mesopore volume V1 of activated carbon 2 is preferably a value larger than 0.8 cc/g, from the viewpoint of a greater output characteristic when the positive electrode material has been incorporated into a power storage element. The mesopore volume is also preferably no greater than 2.5 cc/g from the viewpoint of minimizing reduction in the capacity of the power storage element. The value of V1 is more preferably between 1.00 cc/g and 2.0 cc/g, inclusive, and even more preferably between 1.2 cc/g and 1.8 cc/g, inclusive.

On the other hand, the micropore volume V2 of the activated carbon 2 is preferably a value larger than 0.8 cc/g, in order to increase the specific surface area of the activated carbon and increase the capacity. From the viewpoint of reducing the bulk of the activated carbon, increasing the density as an electrode and increasing the capacity per unit volume, the micropore volume is also preferably no larger than 3.0 cc/g. The value of V2 is more preferably larger than 1.0 cc/g and no larger than 2.5 cc/g, and even more preferably between 1.5 cc/g and 2.5 cc/g, inclusive.

The method of measuring the micropore volume and mesopore volume of the activated carbon 2 may be the method described above for activated carbon 1.

Activated carbon 2 having the mesopore volume V1 and micropore volume V2 described above has a greater BET specific surface area than activated carbon used in conventional electrical double layer capacitors or lithium ion capacitors. The specific value of the BET specific surface area of the activated carbon 2 is preferably between 3,000 m²/g and 4,000 m²/g, inclusive, and more preferably between 3,200 m²/g and 3,800 m/g, inclusive. A BET specific surface area of 3,000 m²/g or greater will tend to result in satisfactory energy density. If the BET specific surface area is 4,000 m²/g or less, on the other hand, there will be no need to add large amounts of a binder to maintain the strength of the electrode, and therefore the performance per volume of the electrode will tend to be higher.

The activated carbon 2 having such features can be obtained, for example, using the starting material and treatment method described below.

The carbon source used as the starting material for the activated carbon 2 is not particularly restricted so long as it is a carbon source that can be used as an activated carbon starting material. Examples include plant-based starting materials such as wood, wood dust and coconut shell; fossil-based starting materials such as petroleum pitch and coke; and various synthetic resins such as phenol resin, furan resin, vinyl chloride resin, vinyl acetate resin, melamine resin, urea resin and resorcinol resin. Of these starting materials, phenol resin and furan resin are especially preferred, being suitable for fabrication of activated carbon 2 with a high specific surface area.

The system used for carbonization of these starting materials, or the heating method during activation treatment, may be a known system such as, for example, a fixed bed system, moving bed system, fluidized bed system, slurry system or rotary kiln system. The atmosphere during heating is an inert gas such as nitrogen, carbon dioxide, helium or argon, or a mixed gas composed mainly of such inert gases in admixture with other gases. A common method employs a carbonization temperature of about 400 to 700° C. and a firing time of about 0.5 to 10 hours.

The activation method for the carbide after carbonization may be, for example, a gas activation method in which firing is accomplished using an activating gas such as water vapor, carbon dioxide or oxygen, or an alkali metal activation method in which heat treatment is carried out after mixture with an alkali metal compound, but an alkali metal activation method is preferred for fabrication of activated carbon with a large specific surface area.

In this activation method, a carbide and an alkali metal compound such as KOH or NaOH are mixed so that the weight ratio of carbide:alkali metal compound is 1:≥1 (the amount of the alkali metal compound being equal to or greater than the amount of the carbide), after which heat treatment is carried out in a range of 600 to 900° C. for 0.5 to 5 hours under an inert gas atmosphere, and then the alkali metal compound is subjected to cleaning removal with an acid or water, and drying is performed.

In order to increase the micropore volume and not increase the mesopore volume, the amount of carbide may be increased during activation, and mixed with KOH. In order to increase both pore volumes, a larger amount of KOH may be used. In order to increase mainly the mesopore volume, steam-activation may be carried out after alkaline activation treatment.

The mean particle size of the activated carbon 2 is preferably between 1 μm and 30 μm, inclusive. The value is more preferably between 2 μm and 20 μm, inclusive.

The activated carbon 1 and 2 may each be a single type of activated carbon, or a mixture of two or more different types of activated carbon, such that the mixture as a whole exhibits the characteristic values described above.

Either of the activated carbon 1 or 2 may be selected for use, or both may be used in admixture.

The positive electrode active material may include materials other than the activated carbons 1 and 2 (for example, activated carbon without the specified V1 and/or V2 values, or materials other than activated carbon (such as complex oxides of lithium and transition metals)). In the exemplary mode, the content of the activated carbon 1, or the content of the activated carbon 2, or the total content of the activated carbons 1 and 2, is preferably greater than 50 weight %, more preferably 70 weight % or greater, even more preferably 90 weight % or greater and most preferably 100 weight %, of the total positive electrode active material.

[Negative Electrode Active Material]

The negative electrode active material includes a carbon material that can occlude and release lithium ions. The negative electrode active material used may be the carbon material alone, or another material that occludes and releases lithium ion may be used in addition to the carbon material. The other materials may be, for example, a lithium titanium complex oxide or a conductive polymer. In the exemplary mode, the content of carbon materials that can occlude and release lithium ion is preferably 50 weight % or greater and more preferably 70 weight % or greater, based on the total amount of the negative electrode active material. The content may be 100 weight %, but from the viewpoint of obtaining a satisfactory effect by combined used with other materials, it is preferably, for example, no greater than 90 weight %, and may even be 80 weight % or lower.

Examples of carbon materials that can occlude and release lithium ion include hard carbon, easily graphitizing carbon, and composite porous carbon materials.

More preferred examples of negative electrode active materials are the composite porous materials 1 and 2 comprising a carbon material coated over the surface of activated carbon, as described below, and composite porous material 3, having a carbonaceous material coated over carbon black. These are advantageous in terms of negative electrode resistance. The composite porous materials 1, 2 and 3 may be used as any one alone, or two or more may be used in admixture. As the carbon material of the negative electrode active material there may be used one or more selected from among composite porous materials 1, 2 and 3, or another carbon material may also be used in combination with one or more selected from among composite porous materials 1, 2 and 3.

The composite porous materials 1, 2 and 3 and other carbon materials will now be explained in order.

[Composite Porous Material 1]

The composite porous material 1 is a composite porous material specified by the following mesopore volume Vm1 and micropore volume Vm2.

The composite porous material 1 is a material that satisfies the inequalities $0.010 \le Vm1 \le 0.250$, $0.001 \le Vm2 \le 0.200$ and $1.5 \le Vm1/Vm2 \le 20.0$, where Vm1 (cc/g) is the mesopore volume due to pores with diameters of between 20 angstrom and 500 angstrom, inclusive, as calculated by the BJH method, and Vm2 (cc/g) is the micropore volume due to pores with diameters of smaller than 20 angstrom as calculated by the MP method.

The composite porous material can be obtained, for example, by combining activated carbon and a carbon material precursor, and subjecting them in this state to heat treatment.

The activated carbon used as the starting material for composite porous material 1 is not particularly restricted so long as the obtained composite porous material 1 exhibits the desired properties. For example, it is possible to use a commercially available product obtained from a petroleum-based, coal-based, plant-based or polymer-based starting material. It is particularly preferred to use activated carbon powder having a mean particle size of between 1 μm and 15 μm, inclusive. The mean particle size is more preferably between 2 μm and 10 μm, inclusive.

A carbon material precursor to be used as a starting material for the composite porous material 1 is an organic material that allows the carbon material to be coated over activated carbon by heat treatment. The carbon material precursor may be a solid or liquid, or a substance that is soluble in a solvent. Such a carbon material precursor may be, for example, pitch, mesocarbon microbeads, coke or a synthetic resin (for example, a phenol resin). Among such carbon material precursors, the use of inexpensive pitch is preferred in terms of production cost. Pitch is largely classified as petroleum pitch or coal pitch. Examples of petroleum pitch include crude oil distillation residue, fluid catalytic cracking residue (decant oil and the like), bottom oil from thermal crackers, and ethylene tar obtained during naphtha cracking.

When pitch is used, the composite porous material 1 is obtained by heat treatment of the pitch in the co-presence of activated carbon, causing thermal reaction of the volatile components and thermally decomposing components of the pitch on the surface of the activated carbon to coat the carbon material onto the activated carbon. In this case, coating of the volatile components or thermally decomposing components of the pitch inside the pores of the activated carbon proceeds at a temperature of about 200 to 500° C., and the coated components undergo reaction to a carbon material at 400° C. or higher. The peak temperature during heat treatment (maximum ultimate temperature) is appropriately determined by the properties for the obtained composite porous material 1, the thermal reaction pattern and thermal reaction atmosphere. The temperature is preferably 400° C. or higher, more preferably 450° C. to 1,000° C., and even more preferably about 500 to 800° C. The time for which the peak temperature is maintained during heat treatment is preferably 30 minutes to 10 hours, preferably 1 hour to 7 hours and more preferably 2 hours to 5 hours. For example, with heat treatment at a peak temperature of about 500 to 800° C. over a period of 2 hours to 5 hours, the carbon material that has been coated onto the activated carbon surface is potentially converted to polycyclic aromatic hydrocarbons.

The softening point of the pitch used as the carbon material precursor is preferably between 30° C. and 250° C. and more preferably between 60° C. and 130° C. If the softening point of the pitch is 30° C. or higher, it will be possible to accomplish precise charging in without impairing the handleability. If the temperature is no higher than 250° C., the amount of low molecular compounds will be relatively high, and it will be possible to accomplish coating even of the relatively fine pores in the activated carbon.

The specific method for producing the composite porous material may be, for example:

a method of heat treating activated carbon in an inert atmosphere including hydrocarbon gas that has volatilized from a carbon material precursor, and coating the carbon material in the gas phase;

a method of premixing activated carbon with a carbon material precursor and heat treating the mixture; or a method of coating a carbon material precursor dissolved in a solvent onto activated carbon, and then drying and heat treating it.

The composite porous material 1 is obtained by coating a carbon material over the surface of activated carbon. The pore distribution after coating of the carbon material into the fine pores of the activated carbon is important. The pore distribution may be specified by the mesopore volume and the micropore volume. Particularly important for this embodiment are the absolute values of the mesopore volume and the micropore volume, and the mesopore volume/micropore volume ratio.

For one mode of the invention, where $Vm1$ (cc/g) is the mesopore volume due to pores with diameters of between 20 angstrom and 500 angstrom, inclusive, as calculated by the BJH method, and $Vm2$ (cc/g) is the micropore volume due to pores with diameters of smaller than 20 angstrom as calculated by the MP method, for the composite porous material 1, preferably the inequalities $0.010 \leq Vm1 \leq 0.250$, $0.001 \leq Vm2 \leq 0.200$ and $1.5 \leq Vm1/Vm2 \leq 20.0$ are satisfied.

For the mesopore volume $Vm1$, more preferably $0.010 \leq Vm1 \leq 0.225$ and even more preferably $0.010 \leq Vm1 \leq 0.200$. For the micropore volume $Vm2$, more preferably $0.001 \leq Vm2 \leq 0.150$ and even more preferably $0.001 \leq Vm2 \leq 0.100$. For the mesopore volume/micropore volume ratio, more preferably $1.5 \leq Vm1/Vm2 \leq 15.0$ and even more preferably $1.5 \leq Vm1/Vm2 \leq 10.0$. If the mesopore volume $Vm1$ is equal to or less than the upper limit ($Vm1 \leq 0.250$) it will be possible to maintain high charge-discharge efficiency for lithium ions, and if the mesopore volume $Vm1$ and micropore volume $Vm2$ are at least the lower limit ($0.010 \leq Vm1$, $0.001 \leq Vm2$), high output characteristics will be obtained.

The ionic conductivity is higher in large-diameter mesopores than in micropores. The mesopore volume is therefore necessary to obtain high output characteristics. In small-diameter micropores, on the other hand, impurities such as moisture that can adversely affect the durability of the power storage element are difficult to desorb. In order to obtain high durability, therefore, it is thought necessary to control the micropore volume. Thus, control of the mesopore volume and micropore volume ratio is important. If the value is at least the lower limit ($1.5 \leq Vm1/Vm2$) (when the carbon material adheres more to the micropores than to the mesopores of the activated carbon, and the composite porous material after coating has a greater mesopore volume and a lesser micropore volume), high energy density, high output characteristics and high durability (cycle characteristics, float properties) can all be achieved. If the ratio of the mesopore volume and micropore volume is equal to or less than the upper limit ($Vm1/Vm2 \leq 20.0$), high output characteristics are obtained.

According to the invention, the method for measuring the mesopore volume $Vm1$ and the micropore volume $Vm2$ is the same as the measuring method for the activated carbon of the positive electrode active material described above.

For one mode of the invention, the mesopore volume/micropore volume ratio after coating of the carbon material on the surface of the activated carbon is important, as explained above. In order to obtain a composite porous material having a pore distribution range as specified according to the invention, the pore distribution of the activated carbon used in the starting material is important.

In activated carbon used to form the composite porous material as the negative electrode active material, if $V1$ (cc/g) is the mesopore volume due to pores with diameters of between 20 angstrom and 500 angstrom, inclusive, as calculated by the BJH method, and $V2$ (cc/g) is the micropore volume due to pores with diameters of smaller than 20 angstrom as calculated by the MP method, then preferably $0.050 \leq V1 \leq 0.500$, $0.005 \leq V2 \leq 1.000$ and $0.2 \leq V1/V2 \leq 20.0$.

For the mesopore volume $V1$, more preferably $0.050 \leq V1 \leq 0.350$ and even more preferably $0.100 \leq V1 \leq 0.300$. For the micropore volume $V2$, more preferably $0.005 \leq V2 \leq 0.850$ and even more preferably $0.100 \leq V2 \leq 0.800$. For the mesopore volume/micropore volume ratio, more preferably $0.22 \leq V1/V2 \leq 15.0$ and even more preferably $0.25 \leq V1/V2 \leq 10.0$. When the mesopore volume $V1$ of the activated carbon is 0.500 or smaller and the micropore volume $V2$ is 1.000 or smaller, coating a suitable amount of carbon material will be sufficient for obtaining a pore structure for the composite porous material 1 according to this embodiment, and it will therefore tend to be easier to control the pore structure. For the same reason, if the mesopore volume $V1$ of the activated carbon is 0.050 or greater and the micropore volume $V2$ is 0.005 or greater, or even if the $V1/V2$ ratio is 0.2 or greater and $V1/V2$ is no greater than 20.0, it will be easy to obtain a pore structure for the composite porous material 1 of this embodiment from the pore distribution of the activated carbon.

The mean particle size of the composite porous material 1 of this embodiment is preferably between 1 μm and 10 μm, inclusive. The lower limit is more preferably 2 μm and even more preferably 2.5 μm. The upper limit is more preferably 6 μm and even more preferably 4 μm. If the mean particle size is between 1 μm and 10 μm, inclusive, then satisfactory durability will be maintained.

For the composite porous material 1, the atomic ratio of hydrogen/carbon atom (hereunder also referred to as "H/C") is preferably between 0.05 and 0.35, inclusive, and more preferably between 0.05 and 0.15, inclusive. If H/C is 0.35 or smaller, the structure of the carbon material adhering to the activated carbon surface (typically a polycyclic aromatic conjugated structure) will sufficiently develop and the capacity (energy density) and charge-discharge efficiency will therefore increase, and this is therefore preferred. If H/C is 0.05 or larger, on the other hand, there will be no excessive carbonization, and therefore satisfactory energy density will be obtained. The H/C ratio is measured with an elemental analyzer.

The composite porous material 1 has an amorphous structure derived from the activated carbon of the starting material, and preferably has a crystal structure derived mainly from the coated carbon material. A low-crystalline structure is preferred in order to exhibit high output characteristics, while a high-crystalline structure is preferred to maintain reversibility of charge-discharge. From this viewpoint, in the composite porous material 1, preferably the plane spacing $d_{002}$ of the (002) plane, measured by wide-angle X-ray diffraction, is between 3.60 angstrom and 4.00 angstrom, inclusive, and the crystallite size Lc in the c-axis direction obtained from the half-power band width of the peak is between 8.0 angstrom and 20.0 angstrom, inclusive, and more preferably $d_{002}$ is between 3.60 angstrom and 3.75 angstrom, inclusive, and the crystallite size Lc in the c-axis direction obtained from the half-power band width of the peak is between 11.0 angstrom and 16.0 angstrom, inclusive.

[Composite Porous Material 2]

The composite porous material 2 is a composite porous material having a carbon material coated on the surface of activated carbon, the weight ratio of the carbon material with respect to the activated carbon being between 10% and 60%, inclusive. The weight ratio is preferably between 15% and 55%, inclusive, more preferably between 18% and 50%, inclusive and most preferably between 20% and 47%, inclusive. If the weight ratio of the carbon material is 10% or greater, it will be possible to suitably fill the micropores of the activated carbon with the carbon material, and the durability will not be impaired due to the increased charge-discharge efficiency of lithium ions. If the weight ratio of the carbonaceous material is 60% or smaller, the specific surface area can be increased by appropriately maintaining the pores that were in the activated carbon. This will allow the lithium ion doping amount to be increased. As a result, it will be possible to maintain high power density and high durability even when the negative electrode is formed as a thin-film.

The specific surface area of the composite porous material 2 measured by the BET method is preferably 350 m$^2$/g to 1,500 m$^2$/g and more preferably 400 m$^2$/g to 1,100 m$^2$/g. If the specific surface area is 350 m$^2$/g or greater, it may be said that the composite porous material 2 appropriately maintains its pores. The lithium ion doping amount can therefore be increased, and as a result, the negative electrode can be made into a thin-film. If the specific surface area is 1,500 m$^2$/g or smaller, on the other hand, it may be said that the micropores of the activated carbon have been suitably filled. The lithium ion will therefore have improved charge-discharge efficiency, without impairment of durability.

The composite porous material 2 can be obtained, for example, by heat treating the activated carbon and carbon material precursor in a combined state. Specific examples and the heat treatment method for the activated carbon and carbon material precursor for production of composite porous material 2 are the same as for composite porous material 1, and will not be repeated here.

The softening point of the pitch used to obtain the composite porous material 2, however, is preferably between 30° C. and 100° C., inclusive, and more preferably between 35 C and 85° C., inclusive. If the softening point of the pitch is 30° C. or higher, it will be possible to accomplish precise charging in without impairing the handleability. Since pitch with a softening point of no higher than 100° C. will including numerous low molecular compounds, using such pitch will allow coating through to the fine pores in the interior of the activated carbon.

The composite porous material 2 is obtained by coating a carbon material over the surface of activated carbon. The pore distribution after coating of the carbon material into the fine pores of the activated carbon is important. The pore distribution may be specified by the mesopore volume and the micropore volume. The values of Vm1 and Vm2 for composite porous material 2 preferably satisfy one of the following 3 relationships, where Vm1 (cc/g) is the mesopore volume due to pores with diameters of between 20 angstrom and 500 angstrom, inclusive, as calculated by the BJH method, and Vm2 (cc/g) is the micropore volume due to pores with diameters of smaller than 20 angstrom as calculated by the MP method.

$$0.010 \leq Vm1 \leq 0.300 \text{ and } 0.010 \leq Vm2 \leq 0.200 \qquad (1)$$

$$0.010 \leq Vm1 \leq 0.200 \text{ and } 0.200 \leq Vm2 \leq 0.400 \qquad (2)$$

$$0.010 \leq Vm1 \leq 0.100 \text{ and } 0.400 \leq Vm2 \leq 0.650 \qquad (3)$$

For (1) above, more preferably $0.050 \leq Vm1 \leq 0.300$ and $0.010 \leq Vm2 \leq 0.200$.

If the mesopore volume Vm1 is equal to or less than the upper limit (Vm1≤0.300), the specific surface area of the composite porous material can be greater and the lithium ion doping amount can be increased. In addition, the bulk density of the negative electrode can be increased, allowing the negative electrode to be formed as a thin-film. If the micropore volume Vm2 is equal to or less than the upper limit (Vm1≤0.650), high charge-discharge efficiency can be maintained for lithium ions. If the mesopore volume Vm1 and micropore volume Vm2 are at least the lower limits (0.010≤Vm1, 0.010≤Vm2), high output characteristics can be obtained.

For this embodiment, the method for measuring the mesopore volume Vm1 and the micropore volume Vm2 is the same as the measuring method for the activated carbon of the positive electrode active material described above.

The mean particle size, hydrogen/carbon atom atomic ratio (H/C) and crystal structure of composite porous material 2 of this embodiment are each as explained above for composite porous material 1.

For composite porous material 2, the mean pore size is preferably 28 angstrom or greater and more preferably 30 angstrom or greater, from the viewpoint of high output characteristics. From the viewpoint of high energy density, it is preferably no greater than 65 angstrom and more preferably no greater than 60 angstrom. The "mean pore size", for this embodiment, means the value determined by dividing the total pore volume per weight, as obtained by measuring the equilibrium adsorption volumes of nitrogen gas under different relative pressures at the temperature of liquid nitrogen, by the BET specific surface area.

[Composite Porous Material 3]

Composite porous material 3 is a composite porous material comprising a carbonaceous material coated over carbon black. The BET specific surface area of composite porous material 3 is preferably 100 m$^2$/g or greater, and more preferably between 100 m$^2$/g and 350 m$^2$/g, inclusive. The BET specific surface area is even more preferably between 150 m$^2$/g and 300 m$^2$/g, inclusive, and most preferably between 180 m$^2$/g and 240 m$^2$/g, inclusive.

A positive correlation exists between the BET specific surface area of composite porous material 3 and the lithium ion initial charge capacity and allowable doping amount per unit weight of composite porous material 3. This is conjectured to be because as the BET specific surface area increases, the density of lithium ion occlusion sites other than those between the carbon mesh surfaces (for example, the edge surfaces of the carbon mesh surface or the defect sites) increases. Therefore if the BET specific surface area is 100 m$^2$/g or greater, the doping amount can be sufficiently increased thereby allowing the thickness of the negative electrode active material layer to be reduced. Even if the negative electrode active material layer has been reduced in thickness, a high output characteristic can be exhibited since a sufficiently large number of sites are present where doping/undoping of lithium ion takes place (the reaction sites). On the other hand, with a composite porous material 3 having a BET specific surface area of 350 m$^2$/g or smaller, the coatability during formation of the negative electrode active material layer is excellent.

The composite porous material 3 may be obtained by firing or graphitizing a kneaded mixture obtained by kneading carbon black having a mean particle size of 12 to 300 nm as observed under an electron microscope, and a BET specific surface area of 200 to 1,500 m$^2$/g, and a precursor that yields the carbonaceous material, at 800° C. to 3,200° C., and then pulverizing the mixture to a mean particle size (D50) of 1 to 20 μm.

The amount of carbonaceous material precursor to be used for production of the composite porous material 3 is preferably between 30 parts by weight and 200 parts by weight, inclusive, with respect to 100 parts by weight of the carbon black. The amount is more preferably between 30 parts by weight and 150 parts by weight, inclusive. If the proportion is 30 parts by weight or greater, a high output characteristic will be achieved by the effect of compositing. If the proportion is 200 parts by weight or lower, on the other hand, it will be possible to maintain a suitable BET specific surface area and increase the lithium ion doping amount. The negative electrode active material used may be of a single type or a mixture of two or more different types.

The carbon black used as the starting material for the composite porous material 3 may be one of any of the commercially available grades so long as the obtained composite porous material exhibits the desired properties.

As mentioned above, the mean particle size of the carbon black used as the starting material, as observed under an electron microscope, is preferably 12 to 300 nm. The method used for measuring the particle diameter of the carbon black is a method in which photographs are taken with an electron microscope in different visual fields at a magnification of several 10,000×, and the particle diameters of about 2,000 to 3,000 particles in the visual fields are measured using a fully automatic image processor (Carbon Black Handbook, 3rd Edition, (Tosho Shuppan, May 25, 1973) p. 4). For this embodiment, the carbon black used is preferably a mean particle size of 12 to 300 nm, as determined with an electron microscope. Based on the catalog value for each commercially available grade, it is believed that virtually all carbon blacks have particle diameters within this range.

The carbonaceous material precursor used may be petroleum or coal-based pitch, or a resin such as phenol resin, furan resin or divinylbenzene. These may be used as single types, or mixtures of two or more different types may be used. Among such precursors, the use of inexpensive pitch is preferred in terms of production cost.

The carbon black and the carbonaceous material precursor are kneaded using an appropriate kneading machine such as a heating kneader. After kneading, the mixture is fired or graphitized in a non-oxidizing atmosphere at 800° C. to 3,200° C. If the heat treatment temperature is below 800° C., functional groups of the particle surfaces may remain. If functional groups of the particle surface remain, those residual functional groups will react with Li ions in the obtained lithium ion capacitor, and this is undesirable as it will result in increased capacity loss and generation of an inflection point near 1 V in the discharge curve. If the heat treatment temperature exceeds 3,400° C., the graphitized particles may undergo sublimation. Firing or graphitizing at a temperature of no higher than 3,400° C., and especially no higher than 3,200° C., is therefore preferred.

Next, the fired or graphitized product obtained in this manner is pulverized to a mean particle size (D50) of preferably 1 to 20 μm. The lower limit for the mean particle size (D50) is more preferably 5 μm or greater and even more preferably 7 μm or greater. The upper limit for the mean particle size (D50) is more preferably no greater than 20 μm and even more preferably no greater than 15 μm. If the mean particle size (D50) is 5 μm or greater, the electrode peel strength of the negative electrode will be sufficiently high when the composite porous material 3 is used as a negative electrode active material. This is conjectured to be because when the negative electrode active material, conductive filler and binder are dispersed in a solvent to prepare a slurry, and the negative electrode active material layer is coated and dried on a negative current collector, the solid agglutination that occurs with evaporation of the solvent is reduced and cracking of the electrode can be minimized. Another known method for increasing the peel strength of the electrode involves change the type or amount of binder. However, when a composite porous material having a BET specific surface area of 100 m$^2$/g or greater is used as the negative electrode active material, no significant increase has been confirmed in the electrode peel strength of the negative electrode by changing the type and amount of the binder. If the mean particle size (D50) is 20 μm or smaller, the coatability is excellent without streaking, when the negative electrode active material layer is coated on the negative current collector in the manner described above, and this is therefore preferred.

The particle size of the particles after pulverizing is the value measured by laser diffraction.

After pulverizing, firing or graphitizing may be conducted again at 800 to 3,200° C. if necessary.

The composite porous material 3 as the negative electrode active material for the invention is an aggregate comprising a carbonaceous material binding to carbon black, and it is a porous carbon material or graphite material having a specific pore structure.

The pore structure of the composite porous material 3 can be determined from an adsorption isotherm for adsorption/desorption of nitrogen gas.

In the adsorption isotherm for adsorption/desorption of nitrogen gas, the change in adsorption of nitrogen gas is low up to a relative pressure (P/P0) of the nitrogen gas of around 0.8, and drastically increases when it exceeds 0.8. For the composite porous material of the invention, the adsorption of nitrogen gas at a nitrogen gas relative pressure (P/P0) of near 0.99 in the adsorption isotherm for adsorption/desorption of nitrogen gas is preferably 10 to 1,000 ml/g. This condition represents a situation in which for the composite porous material of the invention, the pore volume of micropores with pore diameters of 2 nm and smaller is no greater than 20% of the total pore volume.

The composite porous material 3 of the invention having the specific pore structure described above functions as a negative electrode active material that exhibits both a high output characteristic and high energy density. The starting materials for the composite porous material are inexpensive carbon black and a carbonaceous material precursor (preferably pitch), and it can be obtained by the simple steps of firing or graphitizing of their kneaded mixture, followed by pulverizing. Selection of the grade of the carbon black and selection of its mixing ratio with the carbonaceous material precursor allows the pore structure to be controlled as well.

[Other Carbon Materials]

Examples of other carbon materials to be contained in the negative electrode active material include amorphous carbonaceous materials such as graphite, easily graphitizable carbon materials (soft carbon), hardly graphitizable carbon materials (hard carbon) and polyacene-based substances; carbon nanotubes; fullerenes; carbon nanofoam; or fibrous carbonaceous, that do not qualify as composite porous materials 1 or 2.

When the negative electrode active material contains another carbon material, the proportion of use of the other carbon material is preferably no greater than 50 weight % and more preferably no greater than 20 weight % with respect to the total carbon materials.

[Other Components of Negative Electrode Active Material Layer]

If necessary, a conductive filler and binder, for example, may be added to the negative electrode active material layer in addition to the negative electrode active material.

The type of conductive filler is not particularly restricted, and examples include acetylene black, Ketchen black and vapor grown carbon fibers. The amount of conductive filler added is preferably 0 to 30 weight %, for example, with respect to the negative electrode active material.

The binder is not particularly restricted, and for example, PVdF (polyvinylidene fluoride), PTFE (polytetrafluoroethylene) or styrene-butadiene copolymer may be used. The amount of binder added is preferably in the range of 3 to 20 weight %, for example, with respect to the negative electrode active material.

[Sulfite Ion and Sulfate Ion in Negative Electrode Active Material Layer]

The liquid extract obtained by extraction of the negative electrode active material layer of this embodiment with water includes either or both the following (a) and (b):

(a) $SO_3^{2-}$ ion
(b) $SO_4^{2-}$ ion, the total amount being in the range of $3.0 \times 10^{-8}$ to $5.0 \times 10^{-6}$ mol/m per unit surface area of the negative electrode active material layer.

According to this embodiment, the negative electrode active material layer containing either or both (a) and (b) in the liquid extract upon extraction with water has the advantage of reducing decomposition of the nonaqueous electrolyte at high temperature and minimizing gas generation. While the reason for this is not completely understood, it is conjectured that $Li_2SO_3$, $Li_2SO_4$ and similar compounds formed by one or more of the (a) sulfite ions and (b) sulfate ions accumulate on the negative electrode active material layer, or form a coating film, so that the nonaqueous electrolyte no longer directly contacts with the negative electrode active material, and as a result, reductive decomposition of the nonaqueous electrolyte is reduced.

The water used for extraction may be heavy water or distilled water, for example. The amount of water used is preferably 3 ml with respect to 30 mg of the negative electrode active material.

The extraction will typically be carried out in an Ar box at an environmental temperature of 23° C. for 3 days.

The liquid extract obtained in this manner may be analyzed by ion chromatography, for example, for quantifying of the sulfite ion and sulfate ion, and the obtained value may be divided by the surface area of the negative electrode active material layer supplied for extraction to calculate the aforementioned unit numerical value.

Examples of methods for adding either or both sulfite ion and sulfate ion into a negative electrode active material layer include:

a method of mixing a sulfite ion salt (for example, $Li_2SO_3$) and a sulfate ion salt (for example, $Li_2SO_4$) in the negative electrode active material layer beforehand, and a method of adding either or both a sulfite ion precursor and sulfate ion precursor to the nonaqueous electrolyte, assembling a power storage element, and then adsorbing it or electrochemically depositing it onto the negative electrode active material layer.

The preferred method is to add either or both a sulfite ion precursor and sulfate ion precursor to the nonaqueous electrolyte, assemble a power storage element, and then to electrochemically accumulate either or both a sulfite ion precursor and sulfate ion precursor on the negative electrode active material layer.

The precursors may be, for example, $LiN(SO_2F)_2$, $LiN(SO_2CF_3)_2$, $LiN(SO_2 C_2F_5)_2$, $LiN(SO_2CF_3)(SO_2 C_2F_5)$, $LiN(SO_2CF_3)(SO_2 C_2F_4H)$, $LiC(SO_2F)_3$, $LiC(SO_2CF_3)_3$, $LiC(SO_2 C_2F_5)_3$, $LiCF_3SO_3$ or $LiC_4F_9SO_3$, with $LiN(SO_2F)_2$ being preferred. These salts are electrolyte salts preferably contained in the nonaqueous electrolyte of this embodiment. Therefore, a preferred power storage device for this embodiment, after having been operated, satisfies the condition of containing either or both the sulfite ion precursor and sulfate ion precursor of the negative electrode active material layer.

When a method of electrochemical accumulation has been selected for either or both the sulfite ion precursor and sulfate ion precursor, the negative electrode active material layer of the power storage element will not contain those ions immediately after injection of the electrolyte. Therefore, measurement of the concentration of these ions must be made after injection of the electrolyte, and after appropriate forming (charge, discharge, or storage) to complete the power storage element. During this time, after the power storage element of this embodiment has been adjusted to a voltage of 2.9 V, it is appropriate to carry out extraction with the negative electrode active material layer removed from the power storage element. The reason for adjusting the power storage element supplied for extraction to a voltage of 2.9 V is in order to perform the measurement with the ions contributing to charge-discharge (lithium ion and its counter anion) not in an occluded or adsorbed state at the positive electrode and negative electrode.

The total amount of either or both (a) and (b) is at least $3.0\times10^{-8}$ mol/m per unit surface area of the negative electrode active material layer. This value is preferably $3.0\times10^{-7}$ mol/m$^2$ or greater. If this value is $3.0\times10^{-8}$ mol/m$^2$ or greater and especially $3.0\times10^{-7}$ mol/m$^2$ or greater, it will be possible to reduce reductive decomposition of the nonaqueous electrolyte on the negative electrode active material.

The total amount of either or both (a) and (b) is no greater than $5.0\times10^{-6}$ mol/m$^2$. This value is preferably no greater than $1.0\times10^{-6}$ mol/m$^2$. If this value is no greater than $5.0\times10^{-6}$ mol/m$^2$ and especially no greater than $1.0\times10^{-6}$ mol/m$^2$, then it will be possible for a high input/output characteristic to be exhibited without inhibiting diffusion of Li ion.

[Doping of Negative Electrode Active Material]

The negative electrode active material is preferably doped with lithium ion. The lithium ion doped in the negative electrode active material, as described throughout the present specification, includes three major forms. The first form is lithium ion that occludes the negative electrode active material as a design value, before fabrication of the nonaqueous lithium-type power storage element. The second form is lithium ion occluded in the negative electrode active material during fabrication and shipping of the nonaqueous lithium power storage element. The third form is lithium ion occluded in the negative electrode active material after the nonaqueous lithium power storage element has been used as a device.

The method used for doping the negative electrode with lithium ion may be a known method. For example, it may be a method of shaping the negative electrode active material into an electrode body, and then using the negative electrode as the working electrode and metal lithium as the counter electrode to fabricate an electrochemical cell in combination with a nonaqueous electrolyte, and electrochemically doping it with lithium ion; or a method of doping the negative electrode with lithium ion by contact bonding a metal lithium foil with the negative electrode body and placing it in the nonaqueous electrolyte.

By doping the negative electrode active material with lithium ion it is possible to satisfactorily control the capacity and operating voltage of the obtained power storage element.

The doping amount of lithium ion in the negative electrode active material of this embodiment is between 530 mAh/g and 2,500 mAh/g, inclusive, per unit weight of the composite porous material.

Doping lithium ion lowers the potential of the negative electrode. Thus, when a negative electrode including a negative electrode active material doped with lithium ion is combined with a positive electrode, the cell voltage is increased and the utilizable capacity of the positive electrode is increased. Therefore, the capacity and energy density of the obtained power storage element increases. If the doping amount is an amount exceeding 530 mAh/g, lithium ion will be satisfactorily doped even at irreversible sites of the negative electrode material where lithium ion cannot be desorbed after once being inserted, and it will also be possible to reduce the amount of negative electrode active material per amount of lithium. The negative electrode film thickness can therefore be reduced, and high durability, satisfactory output characteristics and high energy density can be obtained. As the doping amount increases, the negative electrode potential decreases and the durability and energy density increase. If the doping amount is no greater than 2,500 mAh/g, on the other hand, there will be no risk of side-effects such as deposition of lithium metal.

When a metal lithium foil has been contact bonded to dope the negative electrode active material with lithium ion beforehand (for the first form), a preferred mode is one in which the negative electrode active material contains a composite porous material and the composite porous material is doped with lithium ion. In the doping step, it is preferred to apply lithium metal in an amount corresponding to between 760 mAh/g and 2500 mAh/g, inclusive, per unit weight of the composite porous material. This is more preferably between 1,050 mAh/g and 2,050 mAh/g, inclusive, even more preferably between 1,100 mAh/g and 2,000 mAh/g, inclusive and most preferably between 1,200 mAh/g and 1,700 mAh/g, inclusive.

According to a preferred mode in this case, the negative electrode active material contains composite porous material 2 or 3, and the composite porous material is doped with lithium ion.

When lithium ion is doped into the negative electrode active material by contact bonding of metal lithium on the negative electrode body, the amount of lithium ion doped in the negative electrode active material of the nonaqueous lithium-type power storage element during shipping (for the second form) will tend to be lower than the doping amount estimated from the amount of metal lithium that has been applied. The reason for this is that when a nonaqueous lithium-type power storage element is fabricated, some of the lithium ion doped from the applied metal lithium becomes inactivated. Thus, the doping amount in the negative electrode active material of the nonaqueous lithium-type power storage element during shipping is preferably between 620 mAh/g and 2,100 mAh/g, inclusive, per unit weight of the composite porous material. This is more preferably between 760 mAh/g and 1,700 mAh/g, inclusive and even more preferably between 840 mAh/g and 1,500 mAh/g, inclusive.

The amount of lithium ion doped in the negative electrode active material of the nonaqueous lithium-type power storage element after use (for the third form) will tend to be lower than the doping amount during shipping. The reason for this is that when a nonaqueous lithium-type power storage element is used, the doped lithium ion becomes further inactivated. Thus, the doping amount in the negative electrode active material of the nonaqueous lithium-type power storage element after use is preferably between 530 mAh/g and 1,800 mAh/g, inclusive, per unit weight of the composite porous material. This is more preferably between 650 mAh/g and 1,400 mAh/g, inclusive and even more preferably between 730 mAh/g and 1,200 mAh/g, inclusive.

The lithium ion doping amount in the negative electrode active material of the nonaqueous lithium-type power storage element during shipping and after use can be determined from the amount of lithium ion in the liquid extract obtained by extraction with a mixed solvent comprising methanol and IPA (isopropanol), after the negative electrode active material layer of this embodiment has been cleaned with an organic solvent.

The extraction will typically be carried out in an Ar box at an environmental temperature of 23° C.

The lithium ion doping amount in the negative electrode active material can be quantified by analyzing the liquid extract obtained in this manner, using ICP-MS (inductively coupled plasma weight spectrometry), for example. The resulting value may be divided by the amount of negative electrode active material supplied to extraction, to calculate the unit numerical value.

[Common Elements of Positive Electrode and Negative Electrode]

The features common to the positive electrode and negative electrode are:

(1) the components other than the active material of the active material layer, (2) the current collector, and (3) the construction of the electrode body, and these will now be explained in order.

(1) Components Other than Active Material of Active Material Layer

The active material layers of the positive electrode and the negative electrode each further contain known components that are included in active material layers in lithium ion batteries and capacitors, in addition to their active materials. Examples of such known components include binders, conductive fillers and thickening agents, which are not restricted in their types.

Components other than active materials, to be included in the active material layers of the positive electrode and negative electrode of the nonaqueous lithium-type power storage element of this embodiment, will now be explained in detail.

The active material layer may include a conductive filler (for example, carbon black) and a binder, as necessary.

The amount of conductive filler used is preferably 0 to 30 parts by weight and more preferably 1 to 20 parts by weight with respect to 100 parts by weight of the active material. From the viewpoint of high power density it is preferred to use a conductive filler, with the amount used being preferably no greater than 30 parts by weight, as the ratio of the active material in the active material layer will be higher and the power density per volume will tend to be greater.

For the active material layer there is used the aforementioned active material, and if necessary a conductive filler and a binder to anchor the active material onto the current collector as the active material layer. Examples of binders that may be used include polyvinylidene fluoride (PVdF), polytetrafluoroethylene (PTFE), fluorine rubber, styrene-butadiene copolymer and cellulose derivatives. The amount of binder used is preferably in the range of 3 to 20 parts by weight and more preferably in the range of 5 to 15 parts by weight with respect to 100 parts by weight of the active material. If the amount of binder used is no greater than 20 parts by weight, the binder will not cover the surface of the active material. This is preferred as ion access into the active material layer will therefore be more rapid and high power density will be more easily obtained. The amount of binder used is also preferably at least 3 parts by weight, as the active material layer will be more easily anchored onto the collector.

(2) Current Collector

The current collector may be a commonly used current collector used for power storage elements. The current collector is preferably a metal foil that does not undergo deterioration by elution into the electrolyte or reaction with the electrolyte. There are no particular restrictions on such metal foils, and examples include copper foils and aluminum foils. In the power storage element of this embodiment, preferably the positive current collector is an aluminum foil and the negative current collector is a copper foil.

The current collector may be a metal foil without hole, or a metal foil having through-holes (for example, punching metal through-holes) or open hole sections (for example, expanded metal open hole sections). The thickness of the current collector is not particularly restricted but is preferably 1 to 100 µm. The thickness of the current collector is preferably 1 µm or greater, to allow retention of the shape and strength of the electrode bodies having the active material layers anchored to the current collector (the positive electrode and negative electrode of the invention). The thickness of the current collector is also preferably no greater than 100 µm, as the weight and volume will be suitable as a power storage element, and the performance per weight and volume will tend to be high.

(3) Construction of Electrode Body

The electrode body comprises an active material layer on one or both sides of a current collector. According to a typical mode, the active material layer is anchored to the current collector.

The electrode body can be produced by a known electrode production technique for lithium ion batteries or electrical double layer capacitors. For example, various materials that include active materials may be prepared as a slurry with water or an organic solvent, and the slurry coated and dried onto the current collector, with pressing at room temperature or under heating as necessary, to form an active material layer. Various materials including active materials may also be dry-mixed without using a solvent, and the obtained mixture press-molded and then attached to a current collector using a conductive adhesive.

The thickness of the positive electrode active material layer is preferably between 15 µm and 100 µm, inclusive and more preferably between 20 µm and 85 µm, inclusive, per side. If the thickness is 15 µm or greater, sufficient energy density can be exhibited as a capacitor. If the thickness is 100 µm or smaller, on the other hand, high input/output characteristics as a capacitor can be obtained.

The thickness of the negative electrode active material layer is preferably between 20 µm and 45 µm, inclusive and more preferably between 25 µm and 40 µm, inclusive, per side. If the thickness is 20 µm or greater, satisfactory charge-discharge capacity can be exhibited. If the thickness is 45 µm or smaller, on the other hand, the energy density can be increased by reducing the cell volume. The thickness of the negative electrode active material layer, when using composite porous material 2 as the negative electrode active material, is preferably between 20 µm and 45 µm, inclusive and more preferably 20 to 40 µm and even more preferably 25 to 35 µm, per side, from the viewpoint of resistance of the negative electrode.

When the current collector has holes, the thickness of the active material layers of the positive electrode and negative electrode are the average values of the respective thicknesses per side at the sections of the current collectors without holes.

The bulk density of the electrode active material layer in the power storage element electrode of this embodiment is preferably between 0.30 g/cm$^3$ and 1.2 g/cm$^3$, inclusive. If the bulk density is 0.30 g/cm$^3$ or greater, it will be possible to increase the capacity of the electrode per unit volume and to accomplish downsizing of the power storage element. If the bulk density is 1.2 g/cm$^3$ or lower, diffusion of the electrolyte in the voids of the electrode active material layer will be adequate, and the charge-discharge characteristic at high current will be higher. The range is therefore more preferably between 0.35 g/cm$^3$ and 1.0 g/cm$^3$, inclusive.

The bulk density of the positive electrode active material layer is more preferably no greater than 0.70 g/cm$^3$ and especially preferably no greater than 0.65 g/cm$^3$, in order to further increase the charge-discharge characteristic at high current.

The bulk density of the negative electrode active material layer is more preferably 0.60 g/cm$^3$ or greater and most preferably 0.70 g/cm$^3$ or greater from the viewpoint of exhibiting satisfactory conductivity between the active materials and maintaining high strength.

[Separator]

The positive electrode body and negative electrode body formed in this manner are laminated or rotary laminated via a separator, and an electrode laminate body with the positive electrode body, negative electrode body and separator is formed.

The separator of this embodiment is preferably one of the following three modes.

The first is a mode in which the separator of this embodiment is a polyolefin porous film. With a polyolefin porous film it is possible to exhibit low resistance (that is, high power density) and high cycle characteristics.

The porosity of the porous film of this embodiment is preferably 30% to 70% and more preferably 55 to 70%. The porosity is preferably 30% or greater from the viewpoint of following rapid migration of lithium ion at high-rate when the porous film is used as a separator of a capacitor. On the other hand, a porosity of no greater than 70% is preferred from the viewpoint of improving the film strength, and preferred from the viewpoint of reducing self-discharge, when the porous film is used as a separator of a capacitor.

The thickness of the separator in this case is preferably between 10 μm and 50 μm, inclusive. The thickness is preferably 10 μm or greater, as this will tend to reduce self-discharge due to internal microshorts. The thickness is also preferably no greater than 50 μm, as this will tend to result in higher output characteristics of the power storage element.

The second is a mode in which the separator of this embodiment is a two-layer laminated separator having a polyolefin porous film (1) and an insulating porous film (2) formed on one side of the polyolefin porous film (1) (hereunder also referred to as "laminated separator").

The polyolefin porous film of the laminated separator is a porous film formed of a polyolefin.

For this embodiment, the thickness of the polyolefin porous film is preferably between 5 μm and 35 μm, inclusive. The thickness of the polyolefin porous film is preferably 5 μm or greater, in order to minimize microshort circuit of the capacitor and allow the electrolyte to be more thoroughly impregnated, while it is also preferably no greater than 35 μm in order to minimize increase in ion diffusion resistance and exhibit high power density by the capacitor. The thickness of the polyolefin porous film is preferably no greater than 20 μm.

The insulating porous film of the laminated separator is a porous film with electrical insulating properties.

The insulating porous film is formed on one side of the polyolefin porous film.

According to an embodiment of the invention, the insulating porous film preferably includes insulating particles, and more preferably it includes an inorganic filler and a resin binder.

For this embodiment, the thickness of the insulating porous film is preferably between 3 μm and 30 μm, inclusive. The thickness of the insulating porous film is preferably 3 μm or greater to allow temperature increase of the capacitor to be minimized and gasification, smoke or firing to be suppressed when internal short circuit occurs, while it is preferably no greater than 30 μm in order to allow increase in ion diffusion resistance to be reduced and high power density to be exhibited.

Examples of inorganic fillers include oxide-based ceramics such as alumina, silica (silicon oxide), titania, zirconia, magnesia, ceria, yttria, zinc oxide and iron oxide; nitride-based ceramics such as silicon nitride, titanium nitride and boron nitride; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth and quartz sand; and glass fibers. The lithium ion capacitor of this embodiment preferably has a laminated structure so that the insulating porous film of the separator contacts with the negative electrode body.

If the lithium ion capacitor of this embodiment has a laminated structure so that the insulating porous film of the separator contacts with the negative electrode body, then the following effect is presumably exhibited.

In a lithium ion capacitor, the energy capacity of the negative electrode is very large compared to the positive electrode, and therefore by facing the insulating porous film of the separator and the negative electrode body, it is possible to prevent thermal runaway in the case of internal short circuit, reducing the likelihood of gasification, smoke and firing, and to ensure high safety for the lithium ion capacitor.

In a lithium ion capacitor, the positive electrode has faster adsorption/desorption of ions during charge-discharge than the negative electrode, and therefore lowering its speed increases the resistance of the device. Consequently, if a polyolefin film with lower diffusion resistance than the insulating porous film is placed facing the positive electrode side, it will be possible to obtain high power density without increasing the device resistance.

If an insulating porous film with excellent liquid retention is present, it will be possible to obtain high cycle characteristics without causing liquid shortage in the separator during cycling of the device.

For this embodiment, therefore, multiple layers of the polyolefin porous film (1) and insulating porous film (2) may be laminated so long as an insulating porous film contacts with the negative electrode side and a polyolefin film contacts with the positive electrode side. Multiple layers of the polyolefin porous film (1) and insulating porous film (2) may, of course, be alternately laminated. In order to obtain a lithium ion capacitor with a high cycle characteristic at low resistance, however, a two-layer structure is more preferred, with lamination of one polyolefin porous film (1) and one insulating porous film (2).

In the laminated separator of this embodiment, the ratio of the thickness of the insulating porous film with respect to the thickness of the polyolefin porous film is preferably 0.25 to 1.00. The ratio of the thickness of the insulating porous film to that of the polyolefin porous film is preferably 1 or lower to make it possible to minimize increase in the ion diffusion resistance and to achieve lower resistance, while it is preferably 0.25 or higher to allow temperature increase of the capacitor to be minimized and gasification, smoke or firing to be suppressed when internal short circuit occurs.

The thickness of the separator as a whole in this case is preferably between 8 μm and 65 μm, inclusive.

The third is a mode in which the separator of this embodiment is such as a cellulose nonwoven sheet. A cellulose nonwoven sheet has excellent liquid retention for the electrolyte and allows high power density to be exhibited. Since there is no electrode contact due to heat contraction of the separator, it is possible to obtain a device with excellent heat resistance.

The thickness of the separator in this case is preferably between 10 μm and 50 μm, inclusive. The thickness is preferably 10 μm or greater, as this will tend to reduce self-discharge due to internal microshorts. The thickness is also preferably no greater than 50 μm, as this will tend to result in higher output characteristics of the power storage element.

[External Body]

The external body used may be a metal can or laminate film.

The metal can is preferably made of aluminum.

The laminate film is preferably a laminated film of a metal foil and a resin film, an example of which is a three-layer structure comprising the structure: outer layer resin film/metal foil/inner layer resin film. The outer layer resin film serves to prevent damage to the metal foil by contact, and a resin such as nylon or polyester may be suitably used. The metal foil serves to prevent penetration of moisture and gas, and a foil such as copper, aluminum or stainless steel may be suitably used. The inner layer resin film serves to protect the metal foil from the electrolyte housed inside while also providing a melt seal during heat sealing of the external body, and a polyolefin or acid-modified polyolefin may be suitably used.

[Nonaqueous Lithium-Type Power Storage Element]

The nonaqueous lithium-type power storage element of this embodiment has a construction with an electrode laminate body obtained as described above, and the nonaqueous electrolyte, housed in the external body.

The nonaqueous lithium-type power storage element of this embodiment exhibits both high input/output characteristics and high durability at high temperature, as will be concretely verified in the examples described below.

EXAMPLES

The present embodiment will now be explained in detail through examples and comparative examples, with the understanding that these examples are not limitative on the invention.

<Fabrication of Positive Electrode Body>

[Fabrication of Positive Electrode Body a Using Activated Carbon 1]

Crushed coconut shell carbide was subjected to carbonization in a small carbonizing furnace, at 500° C. for 3 hours in nitrogen, to obtain a carbide. The obtained carbide was placed in an activating furnace, water vapor was introduced into the activating furnace at 1 kg/h in a heated state using a preheating furnace, and the temperature was increased to 900° C. over 8 hours for activation. The activated carbide was cooled under a nitrogen atmosphere to obtain activated carbon. The obtained activated carbon was flow-rinsed for 10 hours and then drained. After then drying for 10 hours in an electrodesiccator held at 115° C., it was pulverized for 1 hour with a ball mill to obtain activated carbon 1.

A laser diffraction particle size distribution analyzer (SALD-2000J) by Shimadzu Corp. was used to measure the mean particle size of the activated carbon 1, which was found to be 4.2 μm. A pore distribution measuring apparatus (AUTOSORB-1 AS-1-MP) by Yuasa-Ionics, Inc. was also used to measure the pore distribution. As calculated from QSDFT using the isotherm on the desorption side, the mesopore volume (V1) was 0.52 cc/g and the micropore volume (V2) was 0.88 cc/g. The BET specific surface area determined by the single point BET method was 2,360 m²/g.

A slurry was obtained by mixing 80.8 parts by weight of activated carbon 1, 6.2 parts by weight of Ketchen black, 10 parts by weight of PVDF (polyvinylidene fluoride), 3.0 parts by weight of PVP (polyvinylpyrrolidone) and NIP (N-methylpyrrolidone). The obtained slurry was coated onto one or both sides of a current collector made of aluminum foil with a thickness of 15 μm, and dried and pressed, to obtain positive electrode body A with a positive electrode active material layer thickness of 55 μm per side.

[Fabrication of Positive Electrode Body B Using Activated Carbon 2]

Phenol resin was carbonized in a firing furnace for 2 hours at 600° C. under a nitrogen atmosphere. The obtained fired product was pulverized with a ball mill and sorted, and carbide with a mean particle size of 7 μm was obtained.

The carbide and KOH were mixed at a weight ratio of 1:5, and heated for 1 hour in a firing furnace at 800° C. under a nitrogen atmosphere, for activation. The mixture was subsequently stirred and washed for 1 hour in dilute hydrochloric acid adjusted to a concentration of 2 mol/L, and then boiled and rinsed with distilled water until the pH stabilized to between 5 and 6, after which it was dried to produce activated carbon 2.

When the obtained activated carbon 2 was measured in the same manner as Example 1, the mesopore volume V1 was 1.50 cc/g, the micropore volume V2 was 2.28 cc/g and the BET specific surface area was 3,627 m²/g.

A slurry was obtained by mixing 80.8 parts by weight of activated carbon 2, 6.2 parts by weight of Ketchen black, 10 parts by weight of PVDF (polyvinylidene fluoride), 3.0 parts by weight of PVP (polyvinylpyrrolidone) and NMP (N-methylpyrrolidone). The obtained slurry was coated onto one or both sides of a current collector made of aluminum foil with a thickness of 15 μm, and dried and pressed, to obtain a positive electrode body B with a positive electrode active material layer thickness of 55 μm per side.

<Fabrication of Negative Electrode Body>

[Fabrication of Negative Electrode Body a Using Composite Porous Material 1]

The pore distribution of commercially available coconut shell activated carbon was measured using a pore distribution measuring apparatus (AUTOSORB-1 AS-1-MP) by Yuasa-Ionics, Inc., with nitrogen as the adsorbate. The isotherm at the desorption side was used for calculation of the mesopore volume by the BJH method and the micropore volume by the MP method, as explained above. As a result, the mesopore volume (V1) was 0.198 cc/g, the micropore volume (V2) was 0.695 cc/g, V1/V2=0.29, and the mean pore size was 21.2 angstrom. The BET specific surface area determined by the single point BET method was 1,780 m²/g.

A 150 g portion of the coconut shell activated carbon was placed into a stainless steel mesh basket and placed on a stainless steel vat containing 270 g of coal pitch (softening point: 50° C.), and set in an electric furnace (furnace inner usable dimension: 300 mm×300 mm×300 mm), for heat treatment to obtain composite porous material 1. The heat treatment was carried out under a nitrogen atmosphere, with temperature increase to 600° C. over a period of 8 hours, and 4 hours of holding at the same temperature. This was followed by natural cooling to 60° C., after which the composite porous material 1 to be used as the negative electrode material was removed out of the furnace. When the obtained composite porous material 1 was measured in the same manner as for the activated carbon 1, the BET specific surface area was 262 m²/g, the mesopore volume (Vm1) was 0.1798 cc/g, the micropore volume (Vm2) was 0.0843 cc/g and Vm1/Vm2=2.13.

A slurry was obtained by mixing 83.4 parts by weight of the composite porous material 1, 8.3 parts by weight of acetylene black, 8.3 parts by weight of PVDF (polyvinylidene fluoride) and NMP (N-methylpyrrolidone). The obtained slurry was coated onto both sides of an expanded copper foil, and then dried and pressed to obtain a negative electrode body A with a negative electrode active material layer having a single-side thickness of 60 μm. On one side of the double-sided negative electrode body A there was attached a lithium metal foil corresponding to 760 mAh/g per unit weight of the composite porous material 1. The doping amount in the negative electrode active material of the power storage element assembled using the double-sided negative electrode body A was 680 mAh/g per unit weight of the composite porous material 1.

[Fabrication of Negative Electrode Body B Using Composite Porous Material 2]

The pore distribution of commercially available coconut shell activated carbon was measured using a pore distribution measuring apparatus (AUTOSORB-1 AS-1-MP) by Yuasa-Ionics, Inc., with nitrogen as the adsorbate. The isotherm on the desorption side was used for calculation of the mesopore volume by the BJH method and the micropore volume by the MP method. As a result, the mesopore volume Z (V1) was 0.198 cc/g, the micropore volume ('V2) was 0.695 cc/g, V1/V2=0.29, and the mean pore size was 21.2 angstrom. The BET specific surface area determined by the single point BET method was 1,780 m²/g.

A 150 g portion of the activated carbon was placed into a stainless steel mesh basket and placed on a stainless steel vat containing 150 g of coal pitch (softening point: 90° C.), and then set in an electric furnace (furnace inner usable dimension: 300 mm×300 mm×300 mm), for heat treatment to obtain composite porous material 2. The heat treatment was carried out under a nitrogen atmosphere, with temperature increase to 630° C. over a period of 2 hours, and 4 hours of holding at the same temperature. This was followed by natural cooling to 60° C., after which the composite porous material 2 was removed out of the furnace.

The composite porous material 2 had a weight ratio of 38 weight % of coated carbonaceous material with respect to activated carbon, a BET specific surface area of 434 m²/g, a mesopore volume (Vm1) of 0.220 cc/g and a micropore volume (Vm2) of 0.149 cc/g. A laser diffraction particle size distribution analyzer by Shimadzu Corp. (SALD-2000J) was used to measure the mean particle size, which was found to be 2.88 μm.

A slurry was obtained by mixing 83.4 parts by weight of the composite porous material 2, 8.3 parts by weight of acetylene black, 8.3 parts by weight of PVDF (polyvinylidene fluoride) and NMP (N-methylpyrrolidone). The obtained slurry was coated onto both sides of an expanded copper foil, and then dried and pressed to obtain a negative electrode body B with a negative electrode active material layer having a single-side thickness of 30 μm. On one side of the double-sided negative electrode body B there was attached a lithium metal foil corresponding to 1,500 mAh/g per unit weight of the composite porous material 2. The doping amount in the negative electrode active material of the power storage element assembled using the double-sided negative electrode body B was 1,350 mAh/g per unit weight of the composite porous material 2.

[Fabrication of Negative Electrode Body C Using Composite Porous Material 3]

A kneaded mixture, obtained by kneading 100 parts by weight of carbon black (CB1) with a mean particle size of 30 nm and a BET specific surface area of 254 m²/g and 50 parts by weight of optically isotropic pitch (P1) with a softening point of 110° C. and a metaphase quantity (QI quantity) of 13%, with a heated kneader, was fired in a non-oxidizing atmosphere at 1,000° C. This was pulverized to a mean particle size (D50) of 2 μm to obtain composite porous material 3. The mean particle size of the composite porous material 3 was measured using an MT-3300EX by Nikkiso Co., Ltd.

The absorption isotherm of composite porous material 3 was measured using a pore distribution measuring apparatus (AUTOSORB-1 AS-1-MP) by Yuasa-Ionics, Inc., with nitrogen as the adsorbate. The BET specific surface area determined by the single point BET method was 110 m²/g.

Next, a slurry with a solid concentration of 18 weight % was obtained by mixing 80.0 parts by weight of the composite porous material 3 obtained above, 8.0 parts by weight of acetylene black, 3.0 parts by weight of CMC (carboxymethyl cellulose), 9.0 parts by weight of SBR latex, and distilled water. The obtained slurry was then coated and dried onto both sides of etching copper foil with a thickness of 15 μm, and pressed to obtain negative electrode body C. The thickness per side of the negative electrode active material layers of the obtained negative electrode body C was 20 μm. The thickness of the negative electrode active material layer was determined as the value of subtracting the thickness of the copper foil from the average thickness of the negative electrode measured at 10 locations of the negative electrode using a Linear Gauge Sensor GS-551 by Ono Sokki Co., Ltd. On one side of the double-sided negative electrode body C there was attached a lithium metal foil corresponding to 1,300 mAh/g per unit weight of the composite porous material 3. The doping amount in the negative electrode active material of the power storage element assembled using the double-sided negative electrode body C was 1,040 mAh/g per unit weight of the composite porous material 3.

[Fabrication of Negative Electrode Body D]

A kneaded mixture, obtained by kneading 100 parts by weight of hardly graphitizable carbon and 50 parts by weight of optically isotropic pitch with a softening point of 110° C. and a metaphase quantity (QI quantity) of 13%, with a heated kneader, was fired in a non-oxidizing atmosphere at 1,000° C. This was pulverized to a mean particle size of 2 rpm to obtain a composite hardly graphitizable carbon material having a BET specific surface area of 211 m²/g. The mean particle size of the composite hardly graphitizable carbon material was measured using an MT-3300EX by Nikkiso Co., Ltd.

For the BET specific surface area of the composite hardly graphitizable carbon material, the absorption isotherm was measured using a pore distribution measuring apparatus (AUTOSORB-1 AS-1-MP) by Yuasa-Ionics, Inc., with nitrogen as the adsorbate.

Next, a slurry with a solid concentration of 18 weight % was obtained by mixing 80.0 parts by weight of the composite hardly graphitizable carbon material prepared above, 8.0 parts by weight of acetylene black, 3.0 parts by weight of CMC (carboxymethyl cellulose), 9.0 parts by weight of SBR latex, and distilled water. The obtained slurry was then coated and dried onto both sides of etching copper foil with a thickness of 15 μm, and pressed to obtain negative electrode body D. The thickness per side of the negative electrode active material layers of the obtained negative electrode body D was 20 μm. The thickness of the negative electrode active material layer was determined as the value of subtracting the thickness of the copper foil from the average thickness of the negative electrode measured at 10 locations of the negative electrode using a Linear Gauge Sensor GS-551 by Ono Sokki Co., Ltd. On one side of the double-sided negative electrode body D there was attached a lithium metal foil in an amount corresponding to 520 mAh/g per unit weight of the composite hardly graphitizable carbon material. The doping amount in the negative electrode active material of the power storage element assembled using the double-sided negative electrode body D was 420 mAh/g per unit weight of the composite hardly graphitizable carbon material.

[Fabrication of Negative Electrode Body E]

A kneaded mixture, obtained by kneading 100 parts by weight of graphite and 50 parts by weight of optically isotropic pitch with a softening point of 110° C. and a metaphase quantity (QI quantity) of 13%, with a heated kneader, was fired in a non-oxidizing atmosphere at 1,000° C. This was pulverized to a mean particle size of 5 μm to obtain a coated graphitizable carbon material having a BET specific surface area of 15 $m^2/g$. The mean particle size of the coated graphitizable carbon material was measured using an MT-3300EX by Nikkiso Co., Ltd.

For the BET specific surface area of the coated graphitizable carbon material, the absorption isotherm was measured using a pore distribution measuring apparatus (AUTOSORB-1 AS-1-MP) by Yuasa-Ionics, Inc., with nitrogen as the adsorbate.

Next, a slurry with a solid concentration of 18 weight % was obtained by mixing 80.0 parts by weight of the coated graphitizable carbon material prepared above, 8.0 parts by weight of acetylene black, 3.0 parts by weight of CMC (carboxymethyl cellulose), 9.0 parts by weight of SBR latex, and distilled water. The obtained slurry was then coated and dried onto both sides of etching copper foil with a thickness of 15 μm, and pressed to obtain negative electrode body E. The thickness per side of the negative electrode active material layers of the obtained negative electrode body E was 20 μm. The thickness of the negative electrode active material layer was determined as the value of subtracting the thickness of the copper foil from the average thickness of the negative electrode measured at 10 locations of the negative electrode using a Linear Gauge Sensor GS-551 by Ono Sokki Co., Ltd. On one side of the double-sided negative electrode body E there was attached a lithium metal foil in an amount corresponding to 500 mAh/g per unit weight of the coated graphitizable carbon material. The doping amount in the negative electrode active material of the power storage element assembled using the double-sided negative electrode body E was 350 mAh/g per unit weight of the coated graphitizable carbon material.

Example 1

[Preparation of Electrolyte]

As an organic solvent there was used a mixed solvent of ethylene carbonate (EC):methyl ethyl carbonate (EMC)=33:67 (volume ratio), each electrolyte salt was dissolved so that the concentration ratio of $LiN(SO_2F)_2$ and $LiPF_6$ was 25:75 (molar ratio) with respect to the total electrolyte and the total concentration of $LiN(SO_2F)_2$ and $LiPF_6$ was 1.2 mol/L, and the obtained solution was used as a nonaqueous electrolyte.

The concentrations of $LiN(SO_2F)_2$ and $LiPF_6$ in the prepared electrolyte were 0.3 mol/L and 0.9 mol/L, respectively.

[Assembly and Performance of Power Storage Element]

Positive electrode body A and negative electrode body A were each cut to 100 mm×100 mm, a one-sided positive electrode body A was used for each of the uppermost side and lowermost side, and using 18 double-sided negative electrode body A components and 17 double-sided positive electrode body A components, a polyolefin porous film separator with a thickness of 15 μm was inserted between each negative electrode body A and positive electrode body A (separator A, total of 36). An electrode terminal was then connected to negative electrode body A and positive electrode body A to form an electrode laminate body. The laminate body was inserted into an external body comprising a laminate film, the nonaqueous electrolyte was injected and the external body was sealed to assemble a nonaqueous lithium-type power storage element.

[Quantification of Sulfite Ion and Sulfate Ion in Negative Electrode Active Material Layer]

The power storage element obtained by this step was adjusted to a voltage of 2.9 V, and then disassembled in an Ar box set in a room at an environmental temperature of 23° C. and controlled to the dew point of up to −90° C. and an oxygen concentration of no greater than 1 ppm, and the negative electrode body was removed. The removed negative electrode body was dipped and rinsed in dimethyl carbonate (DMC), and vacuum dried with a side box while maintaining a state without exposure to air. The dried negative electrode body was transferred from the side box to an Ar box while maintaining a state without exposure to air, and was dipped and extracted for 3 days at 23° C. using 3 mL of heavy water with respect to 30 mg of active material, to obtain a negative electrode body liquid extract.

The obtained negative electrode body liquid extract was analyzed by ion chromatography (IC), and the $SO_3^{2-}$ ion concentration (mol/ml) and $SO_4^{2-}$ ion concentration (mol/ml) were quantified.

The ion concentration A (mol/ml) of $SO_3^{2-}$ or $SO_4^{2-}$ in the negative electrode body liquid extract, determined by the method described above, the volume B (ml) of heavy water used for extraction, the weight C (g) of active material layer of the negative electrode used for extraction, and the specific surface area D ($m^2/g$) of the active material layer, were substituted into the following mathematical formula (1):

$$\text{Abundance per unit surface area (mol/}m^2\text{)}=A \times B+(C \times D) \quad (1)$$

to calculate the abundances (mol/$m^2$) of sulfite ion and sulfate ion per unit surface area in the negative electrode body. As a result, the $SO_3^{2-}$ ion and $SO_4^{2-}$ ion amounts were found to be $1.0 \times 10^{-7}$ mol/$m^2$ and $0.4 \times 10^{-7}$ mol/$m^2$, respectively, for a total amount of $1.4 \times 10^{-7}$ mol/$m^2$.

[Measurement of Capacitance]

The power storage element obtained in the aforementioned step was charged to 3.8 V by constant-current/constant-voltage charge held for a constant-voltage charge time of 1 hour with a current value of 1.5 C, and then subjected to constant-current discharge to 2.2 V at a current value of 1.5 C. Based on the capacity Q and voltage change during this time, the capacitance F was calculated according to F=Q/(3.8−2.2), to be 1,000F.

[Calculation of Ra·F and Rc·F]

The power storage element obtained by this step was subjected to constant-current charge at a current value of 1.5 C until reaching 3.8 V, at an environmental temperature of 25° C. for Ra and an environmental temperature of −30° C.

for Rc, and then constant-current/constant-voltage charge was carried out for a total of 2 hours, applying a constant voltage of 3.8 V. This was followed by constant-current discharge to 2.2 V at a current value of 50 C. In the discharge curve (time-voltage) obtained for this procedure, with a voltage of E0 at discharge time=0 seconds, obtained by extrapolating an approximate straight line from the voltage values at discharge time points of 2 seconds and 4 seconds, the values of the internal resistances Ra and Rc were each calculated, using Voltage drop (ΔE)=3.8−E0, and for the internal resistances Ra=ΔE/(50 C (current value)), Rc=ΔE/(50 C (current value)).

The product Ra·F between the capacitance F and the internal resistance Ra at 25° C. was 1.42 ΩF, and the product Rc·F between the capacitance F and the internal resistance Rc at −30° C. was 17.2 ΩF.

[Calculation of Rb/Ra]

The power storage element used for the Ra·F evaluation was stored for 2 months at a cell voltage of 4.0 V and in an environmental temperature of 60° C. In order to maintain the cell voltage of 4.0 V, 4.0 V charging was conducted for a total of 2 hours at a current value of 1.5 C, before storage and each week after initial storage.

The power storage element that had been stored for 2 months was subjected to constant-current charge at a current value of 1.5 C until reaching 3.8 V, at an environmental temperature of 25° C., and then constant-current/constant-voltage charge was carried out for a total of 2 hours, applying a constant voltage of 3.8 V. This was followed by constant-current discharge to 2.2 V at a current value of 50 C. In the discharge curve (time-voltage) obtained for this procedure, with a voltage of E0 at discharge time=0 seconds, and extrapolating an approximate straight line from the voltage values at discharge time points of 2 seconds and 4 seconds, the value of the internal resistance Rb after storage was calculated using Voltage drop (ΔE)=3.8−E0, and internal resistance Rb=ΔE/(50 C (current value)).

The value of Rb (Ω) was divided by the internal resistance Ra (Ω) before storage, as calculated above under [Calculation of Ra·F], to obtain the ratio Rb/Ra as 1.30.

[Measurement of Gas Generated During Storage]

The gas generation of the power storage element obtained by the aforementioned steps, after 2 months of storage with a cell voltage of 4.0 V and an environmental temperature of 60° C., was then measured at 25° C. As a result, the gas generation was $11.2 \times 10^{-3}$ cc/F.

Examples 2 to 52 and Comparative Examples 1 to 11

For Example 1, a nonaqueous lithium-type power storage element was fabricated in the same manner as Example 1, except that the structure of the laminate body and the composition of the electrolyte were as shown in Table 1, and each evaluation was conducted.

The evaluation results are shown in Table 1.

TABLE 1

Power storage element construction and evaluation results (1 of 7, laminate body construction)

| | Separator Type | Positive Electrode body type | Negative electrode body | |
|---|---|---|---|---|
| | | | Type | Initial Li* doping amount (mAh/g) |
| Examples 1 to 4, Comp. Ex. 5 | A | A | A | 680 |
| Examples 5 to 28, Comp. Examples 6, 8 and 10 | A | B | B | 1350 |
| Examples 29 to 52, Comp. Examples 7, 9 and 11 | A | B | C | 1040 |
| Comp. Examples 1 and 2 | A | A | D | 420 |
| Comp. Examples 3 and 4 | A | A | E | 350 |

Power storage element construction and evaluation results (2 of 7, electrolyte composition (1))

| | | | | | | Organic solvent (volume ratio) | | | | | | Additive (weight ratio to total electrolyte) | | |
|---|---|---|---|---|---|---|---|---|---|---|---|---|---|---|
| | Electrolyte salt concentration (mol/L) | | | | | | Component (c) | | | | | | | |
| | | | | | | | | Compound (c2) | | | | | | |
| Example | $LiN(SO_2F)_2$ | $LiPF_6$ | Component (a) EC | Component (b) PC | EMC | Compound (c1) HFE-7000 | HFE7100 | 1,2-Dimethoxy ethane | 1,2-Diethoxy ethane | Methyl propionate | Ethyl propionate | 1,3-PS | 2,4-BS | Propene sultone | PN |
| 1 | 0.3 | 0.9 | 33% | 0 | 67% | 0 | 0 | 0 | 0 | 0 | 0 | 0 | 0 | 0 | 0 |
| 2 | 0.6 | 0.6 | 33% | 0 | 67% | 0 | 0 | 0 | 0 | 0 | 0 | 0 | 0 | 0 | 0 |
| 3 | 0.9 | 0.3 | 33% | 0 | 67% | 0 | 0 | 0 | 0 | 0 | 0 | 0 | 0 | 0 | 0 |
| 4 | 1.2 | 0 | 33% | 0 | 67% | 0 | 0 | 0 | 0 | 0 | 0 | 0 | 0 | 0 | 0 |
| 5 | 0.3 | 0.9 | 33% | 0 | 67% | 0 | 0 | 0 | 0 | 0 | 0 | 0 | 0 | 0 | 0 |
| 6 | 0.6 | 0.6 | 33% | 0 | 67% | 0 | 0 | 0 | 0 | 0 | 0 | 0 | 0 | 0 | 0 |
| 7 | 0.9 | 0.3 | 33% | 0 | 67% | 0 | 0 | 0 | 0 | 0 | 0 | 0 | 0 | 0 | 0 |
| 8 | 1.2 | 0 | 33% | 0 | 67% | 0 | 0 | 0 | 0 | 0 | 0 | 0 | 0 | 0 | 0 |
| 9 | 0.9 | 0.3 | 33% | 0 | 63% | 0 | 4% | 0 | 0 | 0 | 0 | 0 | 0 | 0 | 0 |
| 10 | 0.9 | 0.3 | 33% | 0 | 63% | 4% | 0 | 0 | 0 | 0 | 0 | 0 | 0 | 0 | 0 |

TABLE 1-continued

| Ex | LiN(SO₂F)₂ | LiPF₆ | EC | PC | EMC | HFE-7000 | HFE7100 | 1,2-Dimethoxyethane | 1,2-Diethoxyethane | Methyl propionate | Ethyl propionate | 1,3-PS | 2,4-BS | Propene sultone | PN |
|---|---|---|---|---|---|---|---|---|---|---|---|---|---|---|---|
| 11 | 0.9 | 0.3 | 33% | 0 | 63% | 0 | 0 | 0 | 4% | 0 | 0 | 0 | 0 | 0 | 0 |
| 12 | 0.9 | 0.3 | 33% | 0 | 63% | 0 | 0 | 4% | 0 | 0 | 0 | 0 | 0 | 0 | 0 |
| 13 | 0.9 | 0.3 | 33% | 0 | 63% | 0 | 0 | 0 | 0 | 0 | 4% | 0 | 0 | 0 | 0 |
| 14 | 0.9 | 0.3 | 33% | 0 | 63% | 0 | 0 | 0 | 0 | 4% | 0 | 0 | 0 | 0 | 0 |
| 15 | 0.9 | 0.3 | 33% | 0 | 67% | 0 | 0 | 0 | 0 | 0 | 0 | 1% | 0 | 0 | 0 |
| 16 | 0.9 | 0.3 | 33% | 0 | 67% | 0 | 0 | 0 | 0 | 0 | 0 | 3% | 0 | 0 | 0 |

Power storage element construction and evaluation results (3 of 7, electrolyte composition (2))

| Example | LiN(SO₂F)₂ | LiPF₆ | EC | PC | EMC | HFE-7000 | HFE7100 | 1,2-Dimethoxyethane | 1,2-Diethoxyethane | Methyl propionate | Ethyl propionate | 1,3-PS | 2,4-BS | Propene sultone | PN |
|---|---|---|---|---|---|---|---|---|---|---|---|---|---|---|---|
| 17 | 0.9 | 0.3 | 33% | 0 | 67% | 0 | 0 | 0 | 0 | 0 | 0 | 0 | 1% | 0 | 0 |
| 18 | 0.9 | 0.3 | 33% | 0 | 67% | 0 | 0 | 0 | 0 | 0 | 0 | 0 | 3% | 0 | 0 |
| 19 | 0.9 | 0.3 | 33% | 0 | 67% | 0 | 0 | 0 | 0 | 0 | 0 | 0 | 0 | 1% | 0 |
| 20 | 0.9 | 0.3 | 33% | 0 | 67% | 0 | 0 | 0 | 0 | 0 | 0 | 0 | 0 | 3% | 0 |
| 21 | 0.9 | 0.3 | 33% | 0 | 63% | 4% | 0 | 0 | 0 | 0 | 0 | 1% | 0 | 0 | 0 |
| 22 | 0.9 | 0.3 | 33% | 0 | 63% | 4% | 0 | 0 | 0 | 0 | 0 | 0 | 0 | 1% | 0 |
| 23 | 0.9 | 0.3 | 33% | 0 | 63% | 4% | 0 | 0 | 0 | 0 | 0 | 1% | 0 | 0 | 3% |
| 24 | 0.9 | 0.3 | 33% | 0 | 63% | 4% | 0 | 0 | 0 | 0 | 0 | 0 | 0 | 1% | 3% |
| 25 | 0.9 | 0.3 | 33% | 0 | 63% | 0 | 0 | 4% | 0 | 0 | 0 | 1% | 0 | 0 | 0 |
| 26 | 0.9 | 0.3 | 33% | 0 | 63% | 0 | 0 | 4% | 0 | 0 | 0 | 0 | 0 | 1% | 0 |
| 27 | 0.9 | 0.3 | 33% | 0 | 63% | 0 | 0 | 4% | 0 | 0 | 0 | 1% | 0 | 0 | 3% |
| 28 | 0.9 | 0.3 | 33% | 0 | 63% | 0 | 0 | 4% | 0 | 0 | 0 | 0 | 0 | 1% | 3% |
| 29 | 0.3 | 0.9 | 33% | 0 | 67% | 0 | 0 | 0 | 0 | 0 | 0 | 0 | 0 | 0 | 0 |
| 30 | 0.6 | 0.6 | 33% | 0 | 67% | 0 | 0 | 0 | 0 | 0 | 0 | 0 | 0 | 0 | 0 |
| 31 | 0.9 | 0.3 | 33% | 0 | 67% | 0 | 0 | 0 | 0 | 0 | 0 | 0 | 0 | 0 | 0 |
| 32 | 1.2 | 0 | 33% | 0 | 67% | 0 | 0 | 0 | 0 | 0 | 0 | 0 | 0 | 0 | 0 |

Power storage element construction and evaluation results (4 of 7, electrolyte composition (3))

| Example | LiN(SO₂F)₂ | LiPF₆ | EC | PC | EMC | HFE-7000 | HFE7100 | 1,2-Dimethoxyethane | 1,2-Diethoxyethane | Methyl propionate | Ethyl propionate | 1,3-PS | 2,4-BS | Propene sultone | PN |
|---|---|---|---|---|---|---|---|---|---|---|---|---|---|---|---|
| 33 | 0.9 | 0.3 | 33% | 0 | 63% | 0 | 4% | 0 | 0 | 0 | 0 | 0 | 0 | 0 | 0 |
| 34 | 0.9 | 0.3 | 33% | 0 | 63% | 4% | 0 | 0 | 0 | 0 | 0 | 0 | 0 | 0 | 0 |
| 35 | 0.9 | 0.3 | 33% | 0 | 63% | 0 | 0 | 0 | 4% | 0 | 0 | 0 | 0 | 0 | 0 |
| 36 | 0.9 | 0.3 | 33% | 0 | 63% | 0 | 0 | 4% | 0 | 0 | 0 | 0 | 0 | 0 | 0 |
| 37 | 0.9 | 0.3 | 33% | 0 | 63% | 0 | 0 | 0 | 0 | 0 | 4% | 0 | 0 | 0 | 0 |
| 38 | 0.9 | 0.3 | 33% | 0 | 63% | 0 | 0 | 0 | 0 | 4% | 0 | 0 | 0 | 0 | 0 |
| 39 | 0.9 | 0.3 | 33% | 0 | 67% | 0 | 0 | 0 | 0 | 0 | 0 | 1% | 0 | 0 | 0 |
| 40 | 0.9 | 0.3 | 33% | 0 | 67% | 0 | 0 | 0 | 0 | 0 | 0 | 3% | 0 | 0 | 0 |
| 41 | 0.9 | 0.3 | 33% | 0 | 67% | 0 | 0 | 0 | 0 | 0 | 0 | 0 | 1% | 0 | 0 |
| 42 | 0.9 | 0.3 | 33% | 0 | 67% | 0 | 0 | 0 | 0 | 0 | 0 | 0 | 3% | 0 | 0 |
| 43 | 0.9 | 0.3 | 33% | 0 | 67% | 0 | 0 | 0 | 0 | 0 | 0 | 0 | 0 | 1% | 0 |
| 44 | 0.9 | 0.3 | 33% | 0 | 67% | 0 | 0 | 0 | 0 | 0 | 0 | 0 | 0 | 3% | 0 |
| 45 | 0.9 | 0.3 | 33% | 0 | 63% | 4% | 0 | 0 | 0 | 0 | 0 | 1% | 0 | 0 | 0 |
| 46 | 0.9 | 0.3 | 33% | 0 | 63% | 4% | 0 | 0 | 0 | 0 | 0 | 0 | 0 | 1% | 0 |
| 47 | 0.9 | 0.3 | 33% | 0 | 63% | 4% | 0 | 0 | 0 | 0 | 0 | 1% | 0 | 0 | 3% |
| 48 | 0.9 | 0.3 | 33% | 0 | 63% | 4% | 0 | 0 | 0 | 0 | 0 | 0 | 0 | 1% | 3% |

TABLE 1-continued

Power storage element construction and evaluation results (5 of 7, electrolyte composition (4))

| | | | Organic solvent (volume ratio) | | | | | | | | Additive (weight ratio to total electrolyte) | | | |
|---|---|---|---|---|---|---|---|---|---|---|---|---|---|---|
| | | | | | | Component (c) | | | | | | | | |
| | Electrolyte salt concentration (mol/L) | | Component (a) | Component (b) | Compound (c1) | | Compound (c2) | | Compound (c3) | | Propene sultone | | | |
| | | | | | | | 1,2-Dimethoxy ethane | 1,2-Diethoxy ethane | Methyl propionate | Ethyl propionate | | | | |
| Example | LiN(SO$_2$F)$_2$ | LiPF$_6$ | EC | PC | EMC | HFE-7000 | HFE7100 | | | | | 1,3-PS | 2,4-BS | tone | PN |
| 49 | 0.9 | 0.3 | 33% | 0 | 63% | 0 | 0 | 4% | 0 | 0 | 0 | 1% | 0 | 0 | 0 |
| 50 | 0.9 | 0.3 | 33% | 0 | 63% | 0 | 0 | 4% | 0 | 0 | 0 | 0 | 0 | 1% | 0 |
| 51 | 0.9 | 0.3 | 33% | 0 | 63% | 0 | 0 | 4% | 0 | 0 | 0 | 1% | 0 | 0 | 3% |
| 52 | 0.9 | 0.3 | 33% | 0 | 63% | 0 | 0 | 4% | 0 | 0 | 0 | 0 | 0 | 1% | 3% |
| Comp. Example 1 | 0.6 | 0.6 | 33% | 0 | 67% | 0 | 0 | 0 | 0 | 0 | 0 | 0 | 0 | 0 | 0 |
| Comp. Example 2 | 0.9 | 0.3 | 33% | 0 | 67% | 0 | 0 | 0 | 0 | 0 | 0 | 0 | 0 | 0 | 0 |
| Comp. Example 3 | 0.6 | 0.6 | 33% | 0 | 67% | 0 | 0 | 0 | 0 | 0 | 0 | 0 | 0 | 0 | 0 |
| Camp. Example 4 | 0.9 | 0.3 | 33% | 0 | 67% | 0 | 0 | 0 | 0 | 0 | 0 | 0 | 0 | 0 | 0 |
| Comp. Example 5 | 0 | 1.2 | 33% | 0 | 67% | 0 | 0 | 0 | 0 | 0 | 0 | 0 | 0 | 0 | 0 |
| Comp. Example 6 | 0 | 1.2 | 33% | 0 | 67% | 0 | 0 | 0 | 0 | 0 | 0 | 0 | 0 | 0 | 0 |
| Comp. Example 7 | 0 | 1.2 | 33% | 0 | 67% | 0 | 0 | 0 | 0 | 0 | 0 | 0 | 0 | 0 | 0 |
| Comp. Example 8 | 0.1 | 1.1 | 33% | 0 | 67% | 0 | 0 | 0 | 0 | 0 | 0 | 0 | 0 | 0 | 0 |
| Comp. Example 9 | 0.1 | 1.1 | 33% | 0 | 67% | 0 | 0 | 0 | 0 | 0 | 0 | 0 | 0 | 0 | 0 |
| Comp. Example 10 | 3 | 0 | 33% | 0 | 67% | 0 | 0 | 0 | 0 | 0 | 0 | 0 | 0 | 0 | 0 |
| Comp. Example 11 | 3 | 0 | 33% | 0 | 67% | 0 | 0 | 0 | 0 | 0 | 0 | 0 | 0 | 0 | 0 |

Power storage element construction and evaluation results (6 of 7, evaluation results (1))

| Example | capacitance (F) | Ion amounts in negative electrode active material layer (×10$^{-7}$ mol/m$^2$) | | Ra · F (ΩF) | Rc · F (ΩF) | Gas generation during storage (×10$^{-3}$ cc/F) | Rb/Ra |
|---|---|---|---|---|---|---|---|
| | | SO$_3^{2-}$ | SO$_4^{2-}$ | | | | |
| 1 | 1000 | 2.2 | 1.0 | 1.42 | 17.2 | 11.2 | 1.30 |
| 2 | 1000 | 3.3 | 1.4 | 1.25 | 15.5 | 10.0 | 1.25 |
| 3 | 1000 | 4.5 | 2 | 1.24 | 15.0 | 9.0 | 1.25 |
| 4 | 1000 | 6.5 | 3.2 | 1.22 | 14.6 | 8.1 | 1.25 |
| 5 | 1000 | 1.5 | 0.7 | 1.40 | 16.8 | 11.2 | 1.30 |
| 6 | 1000 | 2.6 | 1.1 | 1.22 | 16.7 | 10.0 | 1.25 |
| 7 | 1000 | 3.4 | 1.6 | 1.19 | 15.1 | 9.0 | 1.25 |
| 8 | 1000 | 5.8 | 2.9 | 1.17 | 14.3 | 8.1 | 1.25 |
| 9 | 1000 | 3.4 | 1.6 | 1.35 | 16.5 | 9.0 | 1.25 |
| 10 | 1000 | 3.4 | 1.6 | 1.30 | 15.9 | 9.0 | 1.25 |
| 11 | 1000 | 3.4 | 1.6 | 1.28 | 15.5 | 11.0 | 1.28 |
| 12 | 1000 | 3.4 | 1.6 | 1.25 | 14.9 | 12.7 | 1.29 |
| 13 | 1000 | 3.4 | 1.6 | 1.28 | 15.8 | 11.0 | 1.28 |
| 14 | 1000 | 3.4 | 1.6 | 1.25 | 15.3 | 12.7 | 1.31 |

TABLE 1-continued

Power storage element construction and evaluation results (7 of 7, evaluation results (2))

| Example | capacitance (F) | Ion amounts in negative electrode active material layer (×10⁻⁷ mol/m²) | | Ra · F (ΩF) | Rc · F (ΩF) | Gas generation during storage (×10⁻³ cc/F) | Rb/Ra |
|---|---|---|---|---|---|---|---|
| | | $SO_3^{2-}$ | $SO_4^{2-}$ | | | | |
| 15 | 1000 | 3.4 | 1.6 | 1.30 | 15.9 | 7.2 | 1.25 |
| 16 | 1000 | 3.4 | 1.6 | 1.32 | 16.9 | 5.8 | 1.30 |
| 17 | 1000 | 3.4 | 1.6 | 1.30 | 15.9 | 7.2 | 1.25 |
| 18 | 1000 | 3.4 | 1.6 | 1.32 | 16.9 | 5.8 | 1.30 |
| 19 | 1000 | 3.4 | 1.6 | 1.30 | 15.9 | 7.2 | 1.25 |
| 20 | 1000 | 3.4 | 1.6 | 1.35 | 16.9 | 5.8 | 1.30 |
| 21 | 1000 | 3.4 | 1.6 | 1.30 | 16.2 | 7.2 | 1.25 |
| 22 | 1000 | 3.4 | 1.6 | 1.33 | 16.2 | 7.2 | 1.25 |
| 23 | 1000 | 3.4 | 1.6 | 1.30 | 16.5 | 7.2 | 1.25 |
| 24 | 1000 | 3.4 | 1.6 | 1.33 | 16.5 | 7.2 | 1.25 |
| 25 | 1000 | 3.4 | 1.6 | 1.28 | 14.8 | 8.7 | 1.29 |
| 26 | 1000 | 3.4 | 1.6 | 1.30 | 15.0 | 8.7 | 1.29 |
| 27 | 1000 | 3.4 | 1.6 | 1.30 | 15.5 | 7.2 | 1.29 |
| 28 | 1000 | 3.4 | 1.6 | 1.33 | 16.0 | 7.2 | 1.29 |
| 29 | 1000 | 3.3 | 1.5 | 1.25 | 16.9 | 12.5 | 1.30 |
| 30 | 1000 | 5.1 | 2.4 | 1.10 | 14..5 | 12.2 | 1.25 |
| 31 | 1000 | 6.2 | 3.1 | 1.01 | 9.7 | 12.0 | 1.25 |
| 32 | 1000 | 9.4 | 4.3 | 0.97 | 9.1 | 11.0 | 1.25 |
| 33 | 1000 | 6.2 | 3.1 | 1.20 | 11.3 | 12.0 | 1.25 |
| 34 | 1000 | 6.2 | 3.1 | 1.18 | 10.4 | 12.0 | 1.25 |
| 35 | 1000 | 6.2 | 3.1 | 1.15 | 10.1 | 12.5 | 1.32 |
| 36 | 1000 | 6.2 | 3.1 | 1.10 | 9.4 | 12.5 | 1.32 |
| 37 | 1000 | 6.2 | 3.1 | 1.16 | 10.2 | 12.5 | 1.33 |
| 38 | 1000 | 6.2 | 3.1 | 1.14 | 9.6 | 12.9 | 1.33 |
| 39 | 1000 | 6.2 | 3.1 | 1.18 | 10.4 | 9.0 | 1.25 |
| 40 | 1000 | 6.2 | 3.1 | 1.20 | 11.3 | 7.2 | 1.30 |
| 41 | 1000 | 6.2 | 3.1 | 1.18 | 10.4 | 9.0 | 1.25 |
| 42 | 1000 | 6.2 | 3.1 | 1.20 | 11.3 | 7.2 | 1.30 |
| 43 | 1000 | 6.2 | 3.1 | 1.20 | 10.4 | 9.0 | 1.25 |
| 44 | 1000 | 5.2 | 3.1 | 1.25 | 11.3 | 7.2 | 1.30 |
| 45 | 1000 | 6.2 | 3.1 | 1.20 | 10.4 | 9.0 | 1.25 |
| 46 | 1000 | 6.2 | 3.1 | 1.25 | 10.4 | 9.0 | 1.25 |
| 47 | 1000 | 6.2 | 3.1 | 1.20 | 10.4 | 8.5 | 1.22 |
| 48 | 1000 | 6.2 | 3.1 | 1.25 | 10.4 | 9.0 | 1.25 |
| 49 | 1000 | 6.2 | 3.1 | 1.10 | 9.4 | 12.8 | 1.32 |
| 50 | 1000 | 6.2 | 3.1 | 1.14 | 10.1 | 12.8 | 1.32 |
| 51 | 1000 | 6.2 | 3.1 | 1.10 | 9.4 | 12.0 | 1.30 |
| 52 | 1000 | 6.2 | 3.1 | 1.14 | 10.1 | 12.0 | 1.30 |
| Comp. Ex. 1 | 1000 | 36 | 17 | 1.60 | 28.0 | 12.0 | 1.50 |
| Comp. Ex. 2 | 1000 | 50 | 28 | 2.20 | 38.0 | 9.0 | 1.80 |
| Comp. Ex. 3 | 1000 | 45 | 20 | 2.00 | 33.0 | 11.5 | 1.70 |
| Comp. Ex. 4 | 1000 | 61 | 35 | 2.40 | 41.0 | 8.1 | 1.70 |
| Comp. Ex. 5 | 1000 | 0 | 0 | 1.80 | 27.0 | 20.0 | 1.50 |
| Comp. Ex. 6 | 1000 | 0 | 0 | 1.72 | 25.0 | 20.0 | 1.50 |
| Comp. Ex. 7 | 1000 | 0 | 0 | 1.62 | 21.0 | 26.0 | 1.50 |
| Comp. Ex. 8 | 1000 | 0.08 | 0.05 | 1.70 | 23.5 | 20.0 | 1.50 |
| Comp. Ex. 9 | 1000 | 0.2 | 0.07 | 1.58 | 20.8 | 26.0 | 1.50 |
| Comp. Ex. 10 | 1000 | 38 | 20 | 1.95 | 29.0 | 15.0 | 1.56 |
| Comp. Ex. 11 | 1000 | 38 | 20 | 1.80 | 24.0 | 20.0 | 1.56 |

The names of the organic solvents and additives in Table 1 are as follows.
[Organic Solvents]
EC: Ethylene carbonate
EMC: Methyl ethyl carbonate
PC: Propylene carbonate
HFE7000: $C_3F_7OCH_3$
HFE7100: $C_4F_9OCH_3$
[Additives]
1,3-PS: 1,3-Propanesultone
PN: Ethoxypentafluorocyclotriphosphazene Example 53

[Preparation of Electrolyte]
As an organic solvent there was used a mixed solvent solution of propylene carbonate (PC):methyl ethyl carbonate (EMC)=97.5:2.5 (volume ratio), each electrolyte salt was dissolved so that the concentration ratio of $LiN(SO_2F)_2$ and $LiPF_6$ was 25:75 (molar ratio) with respect to the total electrolyte and the total concentration of $LiN(SO_2F)_2$ and $LiPF_6$ was 1.2 mol/L, and the obtained solution was used as a nonaqueous electrolyte.

The concentrations of $LiN(SO_2F)_2$ and $LiPF_6$ in the prepared electrolyte were 0.3 mol/L and 0.9 mol/L, respectively. The flash point of the nonaqueous electrolyte was measured by the Tag closed-cup method specified by JIS K 2265-1-2007, and was found to be 80° C. or higher and below 90° C.

[Assembly and Performance of Power Storage Element]
Positive electrode body A and negative electrode body A were each cut to 100 mm×100 mm, a one-sided positive electrode body A was used for each of the uppermost side and lowermost side, and using 18 double-sided negative electrode body A components and 17 double-sided positive electrode body A components, a separator having a 5 μm-thick insulating porous layer formed on a polyolefin porous film with a thickness of 16 μm was inserted between each negative electrode body A and positive electrode body A (separator B, total of 36). An electrode terminal was then connected to negative electrode body A and positive electrode body A to form an electrode laminate body. The laminate body was inserted into an external body comprising a laminate film, the nonaqueous electrolyte was injected, the external body was sealed to fabricate a nonaqueous lithium-type power storage element, and the evaluations were conducted in the same manner as Example 1, while a nail-penetration test was also conducted under the following conditions.

[Nail-Penetration Test]
Tester: "Autograph AG-X" by Shimadzu Corp.
Nail: φ2.5 mm-SUS304
Evaluation method: The obtained power storage element was anchored horizontally and penetrated with a nail at a speed of 10 mm/sec, at the nail-penetration position at the center section of the power storage element. The total amount of gas and smoke generated thereafter, and the opened state of the capacitor (the power storage element was opened or not opened) were observed.

All of the evaluation results are shown in Table 2.

Examples 54 to 98 and Comparative Examples 12 to 26

For Example 1, a nonaqueous lithium-type power storage element was fabricated in the same manner as Example 53, except that the structure of the laminate body and the composition of the electrolyte were as shown in Table 2, and each evaluation was conducted. The "separator C" used in Examples 91 to 98 and Comparative Example 24 was a cellulose nonwoven fabric separator.

The evaluation results are shown in Table 2.

TABLE 2

Power storage element construction and evaluation results (1 of 8, laminate body construction)

| | Separator type | Positive electrode body type | Negative electrode body | |
|---|---|---|---|---|
| | | | Type | Initial Li⁻ doping amount (mAh/g) |
| Examples 53 to 56 | B | A | A | 680 |
| Example 57 to 66, Examples 77 to 82, Exampes 89 and 90, Comp. Examples 18, 20 and 22 | B | B | B | 1350 |
| Examples 67 to 76, Examples 83 to 88, Comp. Examples 19, 21 and 23 | B | B | C | 1040 |
| Examples 91 to 94 Camp. Example 24 | C | B | B | 1350 |
| Examples 95 to 98 | C | B | C | 1040 |
| Comp. Examples 12 and 13 | B | A | D | 420 |
| Comp. Examples 14 and 15 | B | A | E | 350 |
| Comp. Example 16 | A | A | D | 420 |
| Comp. Example 17 | A | A | E | 350 |
| Comp. Example 25 | A | B | B | 1350 |
| Comp. Example 26 | A | B | C | 1040 |

TABLE 2-continued

Power storage element construction and evaluation results (2 of 8, electrolyte composition (1))

| | Electrolyte salt concentration (mol/L) | | Organic solvent (volume ratio) | | | | | | | | | Additive (weight ratio to total electrolyte) | | | |
|---|---|---|---|---|---|---|---|---|---|---|---|---|---|---|---|
| | | | Component (a) | Component (b) | Compound (c1) | | Component (c) | | | | | | | | |
| | | | | | | | Compound (c2) | | | | | | | | |
| | | | | | | | 1,2-Dimethoxy ethane | 1,2-Diethoxy ethane | Compound (c3) | | | | | |
| | | | | | | | | | Methyl propionate | Ethyl propionate | | | | |
| Example | LiN(SO$_2$F)$_2$ | LiPF$_6$ | EC | PC | EMC | HFE7000 | HFE-7100 | | | | | 1,3-PS | 2,4-BS | Propene sultone | PN |
| 53 | 0.3 | 0.9 | 0 | 97.5% | 2.5% | 0 | 0 | 0 | 0 | 0 | 0 | 0 | 0 | 0 | 0 |
| 54 | 0.6 | 0.6 | 0 | 97.5% | 2.5% | 0 | 0 | 0 | 0 | 0 | 0 | 0 | 0 | 0 | 0 |
| 55 | 0.9 | 0.3 | 0 | 97.5% | 2.5% | 0 | 0 | 0 | 0 | 0 | 0 | 0 | 0 | 0 | 0 |
| 56 | 1.2 | 0 | 0 | 97.5% | 2.5% | 0 | 0 | 0 | 0 | 0 | 0 | 0 | 0 | 0 | 0 |
| 57 | 0.3 | 0.9 | 0 | 97.5% | 2.5% | 0 | 0 | 0 | 0 | 0 | 0 | 0 | 0 | 0 | 0 |
| 58 | 0.6 | 0.6 | 0 | 97.5% | 2.5% | 0 | 0 | 0 | 0 | 0 | 0 | 0 | 0 | 0 | 0 |
| 59 | 0.9 | 0.3 | 0 | 97.5% | 2.5% | 0 | 0 | 0 | 0 | 0 | 0 | 0 | 0 | 0 | 0 |
| 60 | 1.2 | 0 | 0 | 97.5% | 2.5% | 0 | 0 | 0 | 0 | 0 | 0 | 0 | 0 | 0 | 0 |
| 61 | 0.9 | 0.3 | 0 | 97.5% | 2.5% | 0 | 0 | 0 | 0 | 0 | 0 | 1% | 0 | 0 | 0 |
| 62 | 0.9 | 0.3 | 0 | 97.5% | 2.5% | 0 | 0 | 0 | 0 | 0 | 0 | 3% | 0 | 0 | 0 |
| 63 | 0.9 | 0.3 | 0 | 97.5% | 2.5% | 0 | 0 | 0 | 0 | 0 | 0 | 0 | 1% | 0 | 0 |
| 64 | 0.9 | 0.3 | 0 | 97.5% | 2.5% | 0 | 0 | 0 | 0 | 0 | 0 | 0 | 3% | 0 | 0 |
| 65 | 0.9 | 0.3 | 0 | 97.5% | 2.5% | 0 | 0 | 0 | 0 | 0 | 0 | 0 | 0 | 1% | 0 |
| 66 | 0.9 | 0.3 | 0 | 97.5% | 2.5% | 0 | 0 | 0 | 0 | 0 | 0 | 0 | 0 | 3% | 0 |
| 67 | 0.3 | 0.9 | 0 | 97.5% | 2.5% | 0 | 0 | 0 | 0 | 0 | 0 | 0 | 0 | 0 | 0 |

Power storage element construction and evaluation results (3 of 8, electrolyte composition (2))

| | Electrolyte salt concentration (mol/L) | | Organic solvent (volume ratio) | | | | | | | | | Additive (weight ratio to total electrolyte) | | | |
|---|---|---|---|---|---|---|---|---|---|---|---|---|---|---|---|
| | | | Component (a) | Component (b) | Compound (c1) | | Component (c) | | | | | | | | |
| | | | | | | | Compound (c2) | | | | | | | | |
| | | | | | | | 1,2-Dimethoxy ethane | 1,2-Diethoxy ethane | Compound (c3) | | | | | |
| | | | | | | | | | Methyl propionate | Ethyl propionate | | | | |
| Example | LiN(SO$_2$F)$_2$ | LiPF$_6$ | EC | PC | EMC | HFE7000 | HFE-7100 | | | | | 1,3-PS | 2,4-BS | Propene sultone | PN |
| 68 | 0.6 | 0.6 | 0 | 97.5% | 2.5% | 0 | 0 | 0 | 0 | 0 | 0 | 0 | 0 | 0 | 0 |
| 69 | 0.9 | 0.3 | 0 | 97.5% | 2.5% | 0 | 0 | 0 | 0 | 0 | 0 | 0 | 0 | 0 | 0 |
| 70 | 1.2 | 0 | 0 | 97.5% | 2.5% | 0 | 0 | 0 | 0 | 0 | 0 | 0 | 0 | 0 | 0 |
| 71 | 0.9 | 0.3 | 0 | 97.5% | 2.5% | 0 | 0 | 0 | 0 | 0 | 0 | 1% | 0 | 0 | 0 |
| 72 | 0.9 | 0.3 | 0 | 97.5% | 2.5% | 0 | 0 | 0 | 0 | 0 | 0 | 3% | 0 | 0 | 0 |
| 73 | 0.9 | 0.3 | 0 | 97.5% | 2.5% | 0 | 0 | 0 | 0 | 0 | 0 | 0 | 0 | 0 | 0 |
| 74 | 0.9 | 0.3 | 0 | 97.5% | 2.5% | 0 | 0 | 0 | 0 | 0 | 0 | 0 | 0 | 0 | 0 |
| 75 | 0.9 | 0.3 | 0 | 97.5% | 2.5% | 0 | 0 | 0 | 0 | 0 | 0 | 0 | 1% | 0 | 0 |
| 76 | 0.9 | 0.3 | 0 | 97.5% | 2.5% | 0 | 0 | 0 | 0 | 0 | 0 | 0 | 3% | 0 | 0 |
| 77 | 0.9 | 0.3 | 0 | 95.0% | 5.0% | 0 | 0 | 0 | 0 | 0 | 0 | 1% | 0 | 0 | 0 |
| 78 | 0.9 | 0.3 | 0 | 95.0% | 5.0% | 0 | 0 | 0 | 0 | 0 | 0 | 3% | 0 | 0 | 0 |
| 79 | 0.9 | 0.3 | 0 | 95.0% | 5.0% | 0 | 0 | 0 | 0 | 0 | 0 | 0 | 1% | 0 | 0 |
| 80 | 0.9 | 0.3 | 0 | 95.0% | 5.0% | 0 | 0 | 0 | 0 | 0 | 0 | 0 | 3% | 0 | 0 |
| 81 | 0.9 | 0.3 | 0 | 95.0% | 5.0% | 0 | 0 | 0 | 0 | 0 | 0 | 0 | 0 | 1% | 0 |
| 82 | 0.9 | 0.3 | 0 | 95.0% | 5.0% | 0 | 0 | 0 | 0 | 0 | 0 | 0 | 0 | 3% | 0 |

TABLE 2-continued

Power storage element construction and evaluation results (4 of 8, electrolyte composition (3))

| | Electrolyte salt concentration (mol/L) | | Organic solvent (volume ratio) | | | | | | | | | Additive (weight ratio to total electrolyte) | | | |
|---|---|---|---|---|---|---|---|---|---|---|---|---|---|---|---|
| | | | Component (a) | Component (b) | Component (c) | | | | | | | | | | |
| | | | | | Compound (c1) | | Compound (c2) | | Compound (c3) | | | | | | |
| | | | | | | | 1,2-Dimethoxyethane | 1,2-Diethoxyethane | Methyl propionate | Ethyl propionate | | | | |
| Example | LiN(SO$_2$F)$_2$ | LiPF$_6$ | EC | PC | EMC | HFE7000 | HFE-7100 | | | | | 1,3-PS | 2,4-BS | Propene sultone | PN |
| 83 | 0.9 | 0.3 | 0 | 95.0% | 5.0% | 0 | 0 | 0 | 0 | 0 | 0 | 1% | 0 | 0 | 0 |
| 84 | 0.9 | 0.3 | 0 | 95.0% | 5.0% | 0 | 0 | 0 | 0 | 0 | 0 | 3% | 0 | 0 | 0 |
| 85 | 0.9 | 0.3 | 0 | 95.0% | 5.0% | 0 | 0 | 0 | 0 | 0 | 0 | 0 | 1% | 0 | 0 |
| 86 | 0.9 | 0.3 | 0 | 95.0% | 5.0% | 0 | 0 | 0 | 0 | 0 | 0 | 0 | 3% | 0 | 0 |
| 87 | 0.9 | 0.3 | 0 | 95.0% | 5.0% | 0 | 0 | 0 | 0 | 0 | 0 | 0 | 0 | 1% | 0 |
| 88 | 0.9 | 0.3 | 0 | 95.0% | 5.0% | 0 | 0 | 0 | 0 | 0 | 0 | 0 | 0 | 3% | 0 |
| 89 | 0.9 | 0.3 | 0 | 95.0% | 10.0% | 0 | 0 | 0 | 0 | 0 | 0 | 0 | 0 | 0 | 0 |
| 90 | 0.9 | 0.3 | 0 | 85.0% | 15.0% | 0 | 0 | 0 | 0 | 0 | 0 | 0 | 0 | 0 | 0 |
| 91 | 0.9 | 0.3 | 0 | 100% | 0 | 0 | 0 | 0 | 0 | 0 | 0 | 1% | 0 | 0 | 0 |
| 92 | 0.9 | 0.3 | 0 | 100% | 0 | 0 | 0 | 0 | 0 | 0 | 0 | 3% | 0 | 0 | 0 |
| 93 | 0.9 | 0.3 | 0 | 100% | 0 | 0 | 0 | 0 | 0 | 0 | 0 | 0 | 0 | 1% | 0 |
| 94 | 0.9 | 0.3 | 0 | 100% | 0 | 0 | 0 | 0 | 0 | 0 | 0 | 0 | 0 | 3% | 0 |
| 95 | 0.9 | 0.3 | 0 | 100% | 0 | 0 | 0 | 0 | 0 | 0 | 0 | 1% | 0 | 0 | 0 |
| 96 | 0.9 | 0.3 | 0 | 100% | 0 | 0 | 0 | 0 | 0 | 0 | 0 | 3% | 0 | 0 | 0 |
| 97 | 0.9 | 0.3 | 0 | 100% | 0 | 0 | 0 | 0 | 0 | 0 | 0 | 0 | 0 | 1% | 0 |
| 98 | 0.9 | 0.3 | 0 | 100% | 0 | 0 | 0 | 0 | 0 | 0 | 0 | 0 | 0 | 3% | 0 |

Power storage element construction and evaluation results (5 of 8, electrolyte composition (4))

| | Electrolyte salt concentration (mol/L) | | Organic solvent (volume ratio) | | | | | | | | | Additive (weight ratio to total electrolyte) | | | |
|---|---|---|---|---|---|---|---|---|---|---|---|---|---|---|---|
| | | | Component (a) | Component (b) | Component (c) | | | | | | | | | | |
| | | | | | Compound (c1) | | Compound (c2) | | Compound (c3) | | | | | | |
| | | | | | | | 1,2-Dimethoxyethane | 1,2-Diethoxyethane | Methyl propionate | Ethyl propionate | | | | |
| Example | LiN(SO$_2$F)$_2$ | LiPF$_6$ | EC | PC | EMC | HFE7000 | HFE-7100 | | | | | 1,3-PS | 2,4-BS | Propene sultone | PN |
| Comp. Example 12 | 0.6 | 0.6 | 0 | 97.5% | 2.5% | 0 | 0 | 0 | 0 | 0 | 0 | 0 | 0 | 0 | 0 |
| Comp. Example 13 | 0.9 | 0.3 | 0 | 97.5% | 2.5% | 0 | 0 | 0 | 0 | 0 | 0 | 0 | 0 | 0 | 0 |
| Comp. Example 14 | 0.6 | 0.6 | 0 | 97.5% | 2.5% | 0 | 0 | 0 | 0 | 0 | 0 | 0 | 0 | 0 | 0 |
| Comp. Example 15 | 0.9 | 0.3 | 0 | 97.5% | 2.5% | 0 | 0 | 0 | 0 | 0 | 0 | 0 | 0 | 0 | 0 |
| Comp. Example 16 | 0.9 | 0.3 | 0 | 100% | 0 | 0 | 0 | 0 | 0 | 0 | 0 | 0 | 0 | 0 | 0 |
| Comp. Example 17 | 0.9 | 0.3 | 0 | 100% | 0 | 0 | 0 | 0 | 0 | 0 | 0 | 0 | 0 | 0 | 0 |
| Comp. Example 18 | 0 | 1.2 | 0 | 97.5% | 2.5% | 0 | 0 | 0 | 0 | 0 | 0 | 0 | 0 | 0 | 0 |
| Comp. Example 19 | 0 | 1.2 | 0 | 97.5% | 2.5% | 0 | 0 | 0 | 0 | 0 | 0 | 0 | 0 | 0 | 0 |
| Comp. Example 20 | 0.1 | 1.1 | 0 | 97.5% | 2.5% | 0 | 0 | 0 | 0 | 0 | 0 | 0 | 0 | 0 | 0 |
| Comp. Example 21 | 0.1 | 1.1 | 0 | 97.5% | 2.5% | 0 | 0 | 0 | 0 | 0 | 0 | 0 | 0 | 0 | 0 |

TABLE 2-continued

| | | | | | | | | | | | | | | | |
|---|---|---|---|---|---|---|---|---|---|---|---|---|---|---|---|
| Comp. Example 22 | 3 | 0 | 0 | 97.5% | 2.5% | 0 | 0 | 0 | 0 | 0 | 0 | 0 | 0 | 0 | 0 |
| Comp. Example 23 | 3 | 0 | 0 | 97.5% | 2.5% | 0 | 0 | 0 | 0 | 0 | 0 | 0 | 0 | 0 | 0 |
| Comp. Example 24 | 0 | 1.2 | 0 | 70% | 30% | 0 | 0 | 0 | 0 | 0 | 0 | 0 | 0 | 0 | 0 |
| Comp. Example 25 | 0 | 1.2 | 0 | 100% | 0 | 0 | 0 | 0 | 0 | 0 | 0 | 0 | 0 | 0 | 0 |
| Comp. Example 26 | 0 | 1.2 | 0 | 100% | 0 | 0 | 0 | 0 | 0 | 0 | 0 | 0 | 0 | 0 | 0 |

Power storage element construction and evaluation results (6 of 8, evaluation results (1))

| Example | capacitance (F) | Ion amounts in negative electrode active material layer ($\times 10^{-7}$ mol/m$^2$) $SO_3^{2-}$ | $SO_4^{2-}$ | Ra · F ($\Omega$F) | Rc · F ($\Omega$F) | Gas generation during storage ($\times 10^{-3}$ cc/F) | Rb/Ra | Electrolyte flash point | Nail-penetration test results Gas/smoke generation (total) | Opened or not opened |
|---|---|---|---|---|---|---|---|---|---|---|
| 53 | 1000 | 2.2 | 1 | 1.52 | 23.5 | 6.0 | 1.20 | ≥80° C. | Low | not opened |
| 54 | 1000 | 3.3 | 1.4 | 1.70 | 22.0 | 4.3 | 1.15 | ≥80° C. | Low | not opened |
| 55 | 1000 | 4.5 | 2 | 1.67 | 20.0 | 4.2 | 1.15 | ≥80° C. | Low | not opened |
| 56 | 1000 | 6.5 | 3.2 | 1.58 | 19.3 | 4.0 | 1.15 | ≥80° C. | Low | not opened |
| 57 | 1000 | 1.5 | 0.7 | 1.61 | 20.2 | 6.1 | 1.20 | ≥80° C. | Low | not opened |
| 58 | 1000 | 2.6 | 1.1 | 1.54 | 18.0 | 4.2 | 1.15 | ≥80° C. | Low | not opened |
| 59 | 1000 | 3.4 | 1.6 | 1.52 | 17.0 | 4.2 | 1.15 | ≥80° C. | Low | not opened |
| 60 | 1000 | 5.8 | 2.9 | 1.48 | 16.5 | 4.1 | 1.15 | ≥80° C. | Low | not opened |
| 61 | 1000 | 3.4 | 1.6 | 1.58 | 19.0 | 2.5 | 1.15 | ≥80° C. | Low | not opened |
| 62 | 1000 | 3.4 | 1.6 | 1.72 | 21.0 | 1.5 | 1.20 | ≥80° C. | Low | not opened |
| 63 | 1000 | 3.4 | 1.6 | 1.58 | 19.0 | 2.5 | 1.15 | ≥80° C. | Low | not opened |
| 64 | 1000 | 3.4 | 1.6 | 1.72 | 21.0 | 1.5 | 1.20 | ≥80° C. | Low | not opened |
| 65 | 1000 | 3.4 | 1.6 | 1.60 | 19.6 | 2.5 | 1.15 | ≥80° C. | Low | not opened |
| 66 | 1000 | 3.4 | 1.6 | 1.84 | 22.4 | 1.5 | 1.18 | ≥80° C. | Low | not opened |
| 67 | 1000 | 3.3 | 1.5 | 1.44 | 15.6 | 8.3 | 1.20 | ≥80° C. | Low | not opened |
| 68 | 1000 | 5.1 | 2.4 | 1.32 | 13.3 | 6.1 | 1.15 | ≥80° C. | Low | not opened |
| 69 | 1000 | 6.2 | 3.1 | 1.22 | 11.0 | 6.0 | 1.15 | ≥80° C. | Low | not opened |
| 70 | 1000 | 9.4 | 4.3 | 1.19 | 10.5 | 5.8 | 1.15 | ≥80° C. | Low | not opened |
| 71 | 1000 | 6.2 | 3.1 | 1.32 | 13.2 | 4.5 | 1.15 | ≥80° C. | Low | not opened |
| 72 | 1000 | 6.2 | 3.1 | 1.44 | 14.9 | 3.6 | 1.20 | ≥80° C. | Low | not opened |

Power storage element construction and evaluation results (7 of 8, evaluation results (2))

| Example | capacitance (F) | Ion amounts in negative electrode active material layer ($\times 10^{-7}$ mol/m$^2$) $SO_3^{2-}$ | $SO_4^{2-}$ | Ra · F ($\Omega$F) | Rc · F ($\Omega$F) | Gas generation during storage ($\times 10^{-3}$ cc/F) | Rb/Ra | Electrolyte flash point | Nail-penetration test results Gas/smoke generation (total) | Opened or not opened |
|---|---|---|---|---|---|---|---|---|---|---|
| 73 | 1000 | 6.2 | 3.1 | 1.32 | 13.2 | 4.5 | 1.15 | ≥80° C. | Low | not opened |
| 74 | 1000 | 6.2 | 3.1 | 1.44 | 14.9 | 3.6 | 1.20 | ≥80° C. | Low | not opened |
| 75 | 1000 | 6.2 | 3.1 | 1.35 | 13.6 | 4.5 | 1.15 | ≥80° C. | Low | not opened |
| 76 | 1000 | 6.2 | 3.1 | 1.52 | 15.6 | 3.6 | 1.18 | ≥80° C. | Low | not opened |
| 77 | 1000 | 3.4 | 1.6 | 1.54 | 18.0 | 3.3 | 1.20 | ≥75° C. | Low | not opened |
| 78 | 1000 | 3.4 | 1.6 | 1.68 | 20.0 | 1.9 | 1.25 | ≥75° C. | Low | not opened |
| 79 | 1000 | 3.4 | 1.6 | 1.54 | 18.0 | 3.3 | 1.20 | ≥75° C. | Low | not opened |
| 80 | 1000 | 3.4 | 1.6 | 1.68 | 20.0 | 1.9 | 1.25 | ≥75° C. | Low | not opened |
| 81 | 1000 | 3.4 | 1.6 | 1.58 | 18.8 | 3.3 | 1.20 | ≥75° C. | Low | not opened |
| 82 | 1000 | 3.4 | 1.6 | 1.70 | 21.0 | 1.9 | 1.22 | ≥75° C. | Low | not opened |
| 83 | 1000 | 6.2 | 3.1 | 1.27 | 11.9 | 5.2 | 1.15 | ≥75° C. | Low | not opened |
| 84 | 1000 | 6.2 | 3.1 | 1.38 | 13.5 | 4.3 | 1.20 | ≥75° C. | Low | not opened |
| 85 | 1000 | 6.2 | 3.1 | 1.27 | 11.9 | 5.2 | 1.15 | ≥75° C. | Low | not opened |
| 86 | 1000 | 6.2 | 3.1 | 1.38 | 13.5 | 4.3 | 1.20 | ≥75° C. | Low | not opened |
| 87 | 1000 | 6.2 | 3.1 | 1.31 | 12.5 | 5.2 | 1.15 | ≥75° C. | Low | not opened |

TABLE 2-continued

Power storage element construction and evaluation results (8 of 8, evaluation results (3))

| Example | capacitance (F) | Ion amounts in negative electrode active material layer ($\times 10^{-7}$ mol/m$^2$) $SO_3^{2-}$ | $SO_4^{2-}$ | Ra · F (ΩF) | Rc · F (ΩF) | Gas generation during storage ($\times 10^{-3}$) cc/F | Rb/Ra | Electrolyte flash point | Gas/smoke generation (total) | Nail-penetration test results Opened or not opened |
|---|---|---|---|---|---|---|---|---|---|---|
| 88 | 1000 | 6.2 | 3.1 | 1.46 | 14.2 | 4.3 | 1.18 | ≥75° C. | Low | not opened |
| 89 | 1000 | 3.4 | 1.6 | 1.35 | 20.8 | 6.5 | 1.15 | ≥70° C. | Low | not opened |
| 90 | 1000 | 3.4 | 1.6 | 1.29 | 19.3 | 8.2 | 1.20 | ≥70° C. | Low | not opened |
| 91 | 1000 | 3.4 | 1.6 | 1.75 | 22.1 | 1.9 | 1.10 | ≥90° C. | Low | not opened |
| 92 | 1000 | 3.4 | 1.6 | 1.85 | 23.0 | 0.8 | 1.15 | ≥90° C. | Low | not opened |
| 93 | 1000 | 3.4 | 1.6 | 1.78 | 22.4 | 1.9 | 1.10 | ≥90° C. | Low | not opened |
| 94 | 1000 | 3.4 | 1.6 | 1.88 | 23.8 | 0.8 | 1.13 | ≥90° C. | Low | not opened |
| 95 | 1000 | 6.2 | 3.1 | 1.75 | 20.9 | 2.5 | 1.10 | ≥90° C. | Low | not opened |
| 96 | 1000 | 6.2 | 3.1 | 1.82 | 23.2 | 1.2 | 1.15 | ≥90° C. | Low | not opened |
| 97 | 1000 | 6.2 | 3.1 | 1.80 | 21.9 | 2.5 | 1.10 | ≥90° C. | Low | not opened |
| 98 | 1000 | 6.2 | 3.1 | 1.85 | 23.3 | 1.2 | 1.13 | ≥90° C. | Low | not opened |
| Comp. Ex. 12 | 1000 | 36 | 17 | 3.00 | 39.0 | 6.5 | 1.70 | ≥80° C. | Low | not opened |
| Comp. Ex. 13 | 1000 | 50 | 28 | 3.20 | 42.0 | 6.5 | 1.80 | ≥80° C. | Low | not opened |
| Comp. Ex. 14 | 1000 | 45 | 20 | 3.50 | 42.0 | 5.8 | 1.75 | ≥80° C. | Low | not opened |
| Comp. Ex. 15 | 1000 | 61 | 35 | 3.90 | 46.0 | 5.8 | 1.75 | ≥80° C. | Low | not opened |
| Comp. Ex. 16 | 1000 | 50 | 28 | 4.20 | 48.0 | 5.1 | 1.80 | ≥90° C. | Low | not opened |
| Comp. Ex. 17 | 1000 | 61 | 35 | 4.50 | 52.0 | 4.8 | 1.75 | ≥90° C. | Low | not opened |
| Comp. Ex. 18 | 1000 | 0 | 0 | 2.40 | 33.0 | 15.0 | 1.50 | ≥80° C. | Low | not opened |
| Comp. Ex. 19 | 1000 | 0 | 0 | 1.95 | 25.0 | 18.0 | 1.50 | ≥80° C. | Low | not opened |
| Comp. Ex. 20 | 1000 | 0.08 | 0.05 | 2.25 | 31.5 | 15.0 | 1.50 | ≥80° C. | Low | not opened |
| Comp. Ex. 21 | 1000 | 0.2 | 0.07 | 1.90 | 24.3 | 18.0 | 1.50 | ≥80° C. | Low | not opened |
| Comp. Ex. 22 | 1000 | 38 | 20 | 2.40 | 35.0 | 7.0 | 1.56 | ≥80° C. | Low | not opened |
| Comp. Ex. 23 | 1000 | 38 | 20 | 1.95 | 33.0 | 9.0 | 1.56 | ≥80° C. | Low | not opened |
| Comp. Ex. 24 | 1000 | 0 | 0 | 1.53 | 24.1 | 20.0 | 1.75 | <70° C. | High | opened |
| Comp. Ex. 25 | 1000 | 0 | 0 | 2.05 | 37.0 | 11.0 | 1.50 | ≥90° C. | Low | not opened |
| Comp. Ex. 26 | 1000 | 0 | 0 | 1.65 | 30.0 | 14.0 | 1.50 | ≥90° C. | Low | not opened |

The names of the organic solvents and additives in Table 2 are the same as for Table 1.

The values listed in the column "Electrolyte flash point" in Table 2 have the following meanings.

<70° C.: The electrolyte flash point was below 70° C.

≥10° C.: The electrolyte flash point was 70° C. or above, and below 75° C.

≥75° C.: The electrolyte flash point was 75° C. or above, and below 80° C.

≥80° C.: The electrolyte flash point was 80° C. or above, and below 90° C.

≥90° C.: The electrolyte flash point was 90° C. or above.

The examples verified that the power storage element of this embodiment is a nonaqueous lithium-type power storage element exhibiting a high input/output characteristic, and having low gas generation and internal resistance increase at high temperature.

The nonaqueous lithium-type power storage element of the invention may be suitably used, for example, in the field of hybrid drive systems that combine combustion engines, fuel cells or motors with power storage elements for automobiles; and in assist power source applications for instantaneous electric power peaks.

What is claimed is:

1. A nonaqueous lithium-type power storage element comprising an electrode laminate body having a negative electrode body, a positive electrode body and a separator, and a nonaqueous electrolyte, housed in an external body, wherein the negative electrode body has a negative current collector and a negative electrode active material layer provided on one or both sides of the negative electrode current collector, the negative electrode active material layer comprising a negative electrode active material that includes a carbon material capable of occluding and releasing lithium ions, the carbon material comprising at least one composite porous material selected from the group consisting of composite porous materials having a carbonaceous material coated over activated carbon, and composite porous materials having a carbonaceous material coated over carbon black, the negative electrode active material is doped with lithium ions at between 530 mAh/g and 2,500 mAh/g, inclusive, per unit weight of the composite porous material, the nonaqueous electrolyte has at least 0.5 mol/L of a lithium salt based on the total amount of the nonaqueous electrolyte, and the nonaqueous electrolyte includes at least one ion selected from the group consisting of the following (a) and (b):
(a) $SO_3^{2-}$ ion
(b) $SO_4^{2-}$ ion in a liquid extract when the negative electrode active material layer is extracted with water, the total amount thereof being in the range of $3.0 \times 10^{-8}$ to $5.0 \times 10^{-6}$ mol/m$^2$ on a surface of the negative electrode active material layer.

2. A nonaqueous lithium-type power storage element according to claim 1, wherein the nonaqueous electrolyte comprises $LiN(SO_2F)_2$ at a concentration of between 0.3 mol/L and 1.5 mol/L, inclusive, based on the total amount of the non-aqueous electrolyte solution.

3. A nonaqueous lithium-type power storage element according to claim 1, wherein the nonaqueous electrolyte comprises at least one from among $LiPF_6$ and $LiBF_4$.

4. A nonaqueous lithium-type power storage element according to claim 1, wherein
the nonaqueous electrolyte comprises an organic solvent including
(a) at least one solvent selected from the group consisting of ethylene carbonate and propylene carbonate, and
(b) at least one solvent selected from the group consisting of dimethyl carbonate, diethyl carbonate and ethylmethyl carbonate, and
the volume ratio of (b) is at least 20% based on the total amount of the organic solvent.

5. A nonaqueous lithium-type power storage element according to claim 1, wherein the nonaqueous electrolyte comprises an organic solvent including a compound represented by the following formula (c1):

$$R^1—O—R^2 \quad (c1),$$

wherein
$R^1$ is a halogen atom or a halogenated alkyl group with 1 to 12 carbon atoms, and
$R^2$ is a hydrogen atom, a halogen atom, an alkyl group with 1 to 12 carbon atoms or a halogenated alkyl group with 1 to 12 carbon atoms.

6. A nonaqueous lithium-type power storage element according to claim 1, wherein
the nonaqueous electrolyte comprises an organic solvent including at least one compound selected from the group consisting of compounds represented by the following formulae (c2) and (c3):

$$R^1—O—R^2 \quad (c2)$$

wherein $R^1$ and $R^2$ each independently represent a hydrogen atom, an alkyl group with 1 to 12 carbon atoms, or —Ra—O—Rb, in which Ra is methylene or an alkylene group with 2 to 6 carbon atoms, and Rb is a hydrogen atom or an alkyl group with 1 to 6 carbon atoms, and may be the same or different, with the proviso that $R^1$ and $R^2$ are not both hydrogen atoms, and $$R^3—OC(=O)—R^4 \quad (c3)$$

wherein $R^3$ and $R^4$ each independently represent a hydrogen atom or an alkyl group with 1 to 12 carbon atoms, and may be the same or different.

7. A nonaqueous lithium-type power storage element according to claim 5, wherein
compound (c1) in the non-aqueous electrolyte solution includes at least one type of compound selected from the group consisting of $C_2F_5OCH_3$, $C_3F_7OCH_3$, $C_4F_9OCH_3$, $C_6F_{13}OCH_3$, $C_2F_{50}$ $C_2H_5$, $C_3F_{70}$ $C_2H_5$, $C_4F_9OC_2H_5$, $C_2F_5CF(OCH_3)C_3F_7$, $CF_3CH_2OCF_2CF_2H$, $CHF_2CF_2OCH_2CF_3$, $CHF_2CF_2CH_2OCF_2CF_2H$, $CF_3CF_2CH_2OCF_2CHF_2$, $CF_3CH_2OCF_2CHFCF_3$ and $C_3HF_6CH(CH_3)OC_3HF_6$, and
the volume ratio of the compounds is 0.1% to 50% based on the total amount of the organic solvent.

8. A nonaqueous lithium-type power storage element according to claim 6, wherein
compound (c2) in the non-aqueous electrolyte solution is at least one type of compound selected from the group consisting of 1,2-dimethoxyethane, 1,2-diethoxyethane, 1,2-dipropoxyethane, 1,2-dibutoxyethane, 1,2-ethoxymethoxyethane, 1,2-propoxymethoxyethane, 1,2-butoxymethoxyethane, 1,2-propoxyethoxyethane, 1,2-butoxyethoxyethane and 1,2-butoxypropoxyethane, and
the volume ratio of the compounds is 0.1% to 50% based on the total amount of the organic solvent.

9. A nonaqueous lithium-type power storage element according to claim 6, wherein
compound (c3) in the non-aqueous electrolyte solution includes at least one type of compound selected from the group consisting of methyl propionate, ethyl propionate, propyl propionate, butyl propionate and isobutyl propionate, and
the volume ratio of the compounds is 0.1% to 50% based on the total amount of the organic solvent.

10. A nonaqueous lithium-type power storage element according to claim 1, wherein
the nonaqueous electrolyte comprises an organic solvent including
(a) at least one solvent selected from the group consisting of ethylene carbonate and propylene carbonate, and
(b) at least one solvent selected from the group consisting of dimethyl carbonate, diethyl carbonate and ethylmethyl carbonate,
the volume ratio of (b) is at least 0.5% and less than 20% based on the total amount of the organic solvent, and
the separator is a laminated separator prepared by laminating a polyolefin porous film and an insulating porous film.

11. A nonaqueous lithium-type power storage element according to claim 10, wherein the flash point of the nonaqueous electrolyte is 70° C. or higher.

12. A nonaqueous lithium-type power storage element according to claim 11, wherein the thickness of the polyolefin porous film of the laminated separator is between 5 μm and 35 μm, inclusive, and the ratio of the thickness of the insulating porous film with respect to that of the polyolefin porous film (thickness of insulating porous film/thickness of polyolefin porous film) is 0.25 to 1.00.

13. A nonaqueous lithium-type power storage element according to claim 1, wherein the nonaqueous electrolyte comprises an organic solvent comprising propylene carbonate.

14. A nonaqueous lithium-type power storage element according to claim 1, wherein the nonaqueous electrolyte further comprises at least one type of compound selected from the group consisting of sultone compounds, cyclic phosphazenes, fluorinated cyclic carbonates, cyclic carbonates, cyclic carboxylates and cyclic acid anhydrides.

15. A nonaqueous lithium-type power storage element according to claim 14, wherein
the sultone compound is at least one formula selected from the group consisting of compounds represented by the following formulae (1), (2) and (3):

formula (1)

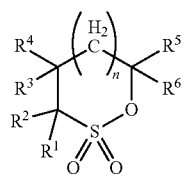

(1)

wherein $R^1$-$R^6$ represent one selected from the group consisting of hydrogen atoms, halogen atoms, alkyl groups with 1 to 12 carbon atoms and halogenated alkyl groups with 1 to 12 carbon atoms, and may be the same or different; and n is an integer of 0 to 3;

formula (2)

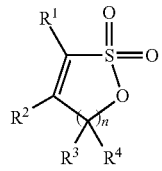

(2)

wherein $R^1$-$R^4$ represent one selected from the group consisting of hydrogen atoms, halogen atoms, alkyl groups with 1 to 12 carbon atoms and halogenated alkyl groups with 1 to 12 carbon atoms, and may be the same or different; and n is an integer of 0 to 3; and formula (3)

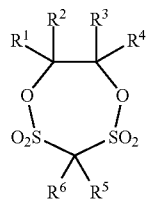

(3)

wherein $R^1$-$R^6$ represent a hydrogen atom, a halogen atom, an alkyl group with 1 to 6 carbon atoms or a halogenated alkyl group with 1 to 6 carbon atoms, and may be the same or different; and the sultone compound is present at 0.1 weight % to 20 weight % based on the total amount of the nonaqueous electrolyte.

16. A nonaqueous lithium-type power storage element according to claim 1, wherein the negative electrode active material is doped by lithium ion at between 620 mAh/g and 2,100 mAh/g, inclusive, per unit weight of the composite porous material, at the time of shipping of the nonaqueous lithium-type power storage element.

17. A nonaqueous lithium-type power storage element according to claim 1, wherein
the negative electrode active material is a composite porous material having a carbon material coated over the surface of activated carbon, and
the negative electrode active material satisfies the inequalities 0.010≤Vm1≤0.250, 0.001≤Vm2≤0.200 and 1.5≤Vm1/Vm2≤20.0, where Vm1 (cc/g) is the mesopore volume due to pores with diameters of between 20 angstrom and 500 angstrom, inclusive, as calculated by the BJH method, and Vm2 (cc/g) is the micropore volume due to pores with diameters of smaller than 20 angstrom as calculated by the MP method.

18. A nonaqueous lithium-type power storage element according to claim 1, wherein
the negative electrode active material is a composite porous material having a carbon material coated over the surface of activated carbon,
the negative electrode active material is doped with lithium ion at between 1,050 mAh/g and 2,050 mAh/g, inclusive, per unit weight of the composite porous material,
the weight ratio of the carbonaceous material with respect to the activated carbon being between 10% and 60%, inclusive, and
the thickness of the negative electrode active material layer being between 20 μm and 45 μm, inclusive, per side.

19. A nonaqueous lithium-type power storage element according to claim 1, wherein the negative electrode active material satisfies all of the following (i) to (iii):
the negative electrode active material is a composite porous material having a carbonaceous material coated over carbon black,
(ii) the negative electrode is doped with lithium ion at between 1,050 mAh/g and 2,500 mAh/g, inclusive per unit weight of the negative electrode active material, and
(iii) the thickness of the negative electrode active material layer is between 10 μm and 60 μm, inclusive, per side.

20. A nonaqueous lithium-type power storage element according to claim 1, wherein
the positive electrode body comprises a positive electrode active material,
the positive electrode active material is activated carbon satisfying the inequalities 0.3<V1≤0.8 and 0.5≤V2≤1.0, where V1 (cc/g) is the mesopore volume due to pores with diameters of between 20 angstrom and 500 angstrom, inclusive, as calculated by the BJH method, and V2 (cc/g) is the micropore volume due to pores with diameters of smaller than 20 angstrom as calculated by the MP method, and
the negative electrode active material has a specific surface area of between 1,500 m²/g and 3,000 m²/g, inclusive, as measured by the BET method.

21. A nonaqueous lithium-type power storage element according to claim 1, wherein the positive electrode body comprises a positive electrode active material, the positive electrode active material is activated carbon satisfying the inequality 0.8<V1≤2.5, where V1 (cc/g) is the mesopore volume due to pores with diameters of between 20 angstrom and 500 angstrom, inclusive, as calculated by the BJH method, the positive electrode active material satisfies the inequality 0.8<V2≤3.0, where V2 (cc/g) is the micropore volume due to pores with diameters of smaller than 20 angstrom as calculated by the MP method, and the positive electrode active material has a specific surface area of between 3,000 m²/g and 4,000 m²/g, inclusive, as measured by the BET method.

22. A nonaqueous lithium-type power storage element comprising an electrode laminate body having a negative electrode body, a positive electrode body and a separator, and a nonaqueous electrolyte, housed in an external body, wherein the negative electrode body has a negative current collector and a negative electrode active material layer provided on one or both sides of the negative current collector, the negative electrode active material layer comprising a negative electrode active material that includes a carbon material capable of occluding and releasing lithium ions, the carbon material being a composite porous material having a carbonaceous material coated over activated carbon and/or a composite porous material having a carbonaceous material coated over carbon black, and the negative electrode active material is doped with lithium ions at between 530 mAh/g and 2,500 mAh/g, inclusive, per unit weight of the composite porous material, the nonaqueous electrolyte has at least 0.5 mol/L of a lithium salt based on the total amount of the nonaqueous electrolyte, the nonaqueous electrolyte includes at least one ion selected from the group consisting of the following (a) and (b):

(a) $SO_3^{2-}$ ion (b) $SO_4^{2-}$ ion in a liquid extract when the negative electrode active material layer is extracted with water, the total amount thereof being in the range of $3.0 \times 10^{-8}$ to $5.0 \times 10^{-6}$ mol/m² on a surface of the negative electrode active material layer, and in the nonaqueous lithium-type power storage element, where Rb (Ω) is the internal resistance at 25° C. after storage for 2 months at a cell voltage of 4 V and in an environmental temperature of 60° C., Ra (Ω) is the internal resistance at 25° C. before such storage, Rc (Ω) is the internal resistance at −30° C. before such storage, and F (F) is the capacitance at 25° C. before such storage, all of the following (a) to (d) are simultaneously satisfied:

(a) the product of Ra and F, Ra·F is 1.9 or smaller, (b) Rb/Ra is 1.8 or smaller, (c) the gas quantity generated upon storage for 2 months at a cell voltage of 4 V and in an environmental temperature of 60° C. is no greater than $13 \times 10^{-3}$ cc/F at 25° C., and (d) the product of Rc and F, Rc·F is 24 or smaller.

* * * * *